(12) United States Patent  
Chayes et al.

(10) Patent No.: US 8,312,049 B2  
(45) Date of Patent: Nov. 13, 2012

(54) NEWS GROUP CLUSTERING BASED ON CROSS-POST GRAPH

(75) Inventors: Jennifer Chayes, Seattle, WA (US); Christian H. Borgs, Seattle, WA (US); Amin Saberi, Atlanta, GA (US); Mohammad Mahdian, Atlanta, GA (US)

(73) Assignee: Microsoft Corporation, Redmond, WA (US)

( * ) Notice: Subject to any disclaimer, the term of this patent is extended or adjusted under 35 U.S.C. 154(b) by 542 days.

(21) Appl. No.: 10/603,034

(22) Filed: Jun. 24, 2003

(65) Prior Publication Data

US 2004/0267686 A1    Dec. 30, 2004

(51) Int. Cl.
*G06F 7/00* (2006.01)
*G06F 17/30* (2006.01)

(52) U.S. Cl. .................................. 707/793; 707/798

(58) Field of Classification Search ................... None
See application file for complete search history.

(56) References Cited

U.S. PATENT DOCUMENTS

| | | | |
|---|---|---|---|
| 5,511,158 A | | 4/1996 | Sims |
| 5,819,269 A | * | 10/1998 | Uomini ............................ 707/7 |
| 5,923,846 A | * | 7/1999 | Gage et al. .................... 709/213 |
| 6,064,971 A | | 5/2000 | Hartnett .......................... 706/46 |
| 6,341,364 B1 | * | 1/2002 | Wever et al. ...................... 716/7 |
| 6,438,580 B1 | * | 8/2002 | Mears et al. .................. 709/204 |
| 6,477,582 B1 | * | 11/2002 | Luo et al. ...................... 709/241 |
| 6,594,673 B1 | * | 7/2003 | Smith et al. ................. 707/104.1 |
| 6,604,105 B1 | | 8/2003 | Roth |
| 6,636,849 B1 | * | 10/2003 | Tang et al. ........................ 707/6 |
| 6,952,700 B2 | * | 10/2005 | Modha et al. ................. 707/101 |

FOREIGN PATENT DOCUMENTS

JP    11096134 A    4/1999

OTHER PUBLICATIONS

"Analysis of gene expression profiles: class discovery and leaf ordering", Ding, Chris H.Q., RECOMB 2002, pp. 127-136, Apr. 2002, Washington, D.C.*
"An intelligent agent for high-precision text filtering", O'Riordan et al., CIKM '95, pp. 205-211, 1995 ACM.*
"A min-max cut algorithm for graph partitioning and data clustering", Ding et al., ICDM 2001, Proceeedings IEEE International Conference, Nov. 29-Dec. 2, 2001, pp. 107-114.*
"On acaling up balanced clustering algorithms", Banerjee et al., Proceedings of the Second SIAM International Conference on Data Mining, Arlington, VA, USA, Apr. 11-13, 2002. SIAM 2002.*
Yossi Azar, et al., Spectral Analysis of Data, ACM Symposium on Theory of Computing, Oct. 31, 2000, pp. 1-15.
Fan R. K. Chung, Lectures on Spectral Graph Theory, Amer. Math. Society, 1997, pp. 1-22.
Miroslav Fiedler, Eigenvectors of Acyclic Matrices, Czechoslovak Mathematical Journal, 1975, pp. 607-618, Praha.
Miroslav Fiedler, A Property of Eigenvectors of Nonnegative Symmetric Matrices and Its Application to Graph Theory, Czechoslovak Mathematical Journal, 1975, pp. 619-633, Praha.

(Continued)

*Primary Examiner* — Jay Morrison
(74) *Attorney, Agent, or Firm* — Lee & Hayes, PLLC

(57) ABSTRACT

A system and/or method that facilitates analyzing newsgroup clusters. A data reception component receives data relating to a plurality of newsgroups and relays the data to an engine that constructs a weighted graph. The weighted graph represents a subset of the newsgroups as vertices of the graph. The vertices are connected by edges, which represent cross-postings relating to the subset of newsgroups.

21 Claims, 21 Drawing Sheets

OTHER PUBLICATIONS

David Gibson, et al., Inferring Web Communities from Link Topology, Proceedings of the 9th ACM Conference on Hypertext and Hypermedia, Jun. 1998, pp. 1-17, Pittsburgh, Pennsylvania.
Horst D. Simon, Partitioning of Unstructured Problems for Parallel Processing, Computing Systems in Engineering, 1991, pp. 1-14.
Daniel A. Spielman, et al., Spectral Partitioning Works: Planar Graphs and Finite Element Meshes, IEEE Symposium on Foundations of Computer Science, Feb. 13, 1996. pp. 1-34.
Stanley Wasserman, et al., Social Network Analysis, 1994, Cambridge University Press.
Lars Hagen, et al., New Spectral Methods for Ratio Cut Partitioning and Clustering, IEEE Transactions on Computer-Aided Design, Sep. 1992, pp. 1074-1085, vol. 11-No. 9.
R. Kannan, et al., Majara: Fast Comprehensive Keyword Summary and Classification, http://web.archive.org/web/20020208070931/cluster.cs.yale.edu.html.
Christos H. Papadimitriou, et al., Latent Semantic Indexing: A Probabilistic Analysis, PODS 98, 1998, pp. 158-168, Seattle, WA, USA.
Alex Pathon, et al., Partitioning Sparse Matrices With Eigenvectors or Graphs, SIAM J. Matrix Anal. Appl., Jul. 1990, pp. 430-452, vol. 11-No. 3.
Jianbo Shi, et al., Normalized Cuts and Image Segmentation, IEEE Transactions on Pattern Analysis and Machine Intelligence, Aug. 2000, pp. 888-905, vol. 22-No. 8.
William Aiello, et al. "A Random Graph Model for Power Law Graphs", 2000, pp. 1-25.
Reka Albert, et al. "Diameter of the World-Wide Web", Nature, Sep. 9, 1999, p. 130, vol. 401, Macmillan Magazines, Ltd.
Reka Albert, "Statistical Mechanics of Complex Networks", A Dissertation, Apr. 2001, 168 pages, Notre Dame, Indiana.
Albert Laszlo Barabasi, et al. "Emergence of Scaling in Random Networks", Science, Oct. 15, 1999, pp. 509-512, vol. 286.
Albert Laszlo Barabasi, et al. "Mean-field Theory for Scale-free Random Networks", Physica A, Jul. 1, 1999, pp. 173-187.
Albert Laszlo Barabasi, et al. "Scale-free Characteristics of Random Networks: the Topology of the World Wide Web", Physica A, 2000, pp. 69-77.
G. Bianconi, et al. "Competition and Multi-scaling in Evolving Networks", Europhysics Letters, May 15, 2001, pp. 436-442, vol. 54, No. 4.
B. Bollobas, et al. "The diameter of a scale-free random graph", Aug. 9, 2002, pp. 1- 27.
B. Bollobas, et al. "The degree sequence of a scale-free random graph process", Random Structures and Algorithms, Jan. 2001, pp. 279-290.
A. Broder, et al. "Graph Structure in the Web", Proceedings of the 9th WWW Conference, 2000, pp. 309-320.
C. Cooper, et al. "A general model of web graphs", Jan. 30, 2003, pp. 1-21.
M. Faloutsos, et al. "On power-law relationships of the internet topology", SIGCOMM 1999, 12 pages.
H. Jeong, et al. "The large-scale organization of metabolic networks", Nature, Oct. 5, 2000, pp. 651-654, vol. 407.
J. Kleinberg, et al. "The Web as a graph: measurements, models, and methods", COCOON 1999, 18 pages.
R. Kumar, et al. "Extracting large scale knowledge bases from the web", Proceedings of the 25th VLDB Conference, 1999, pp. 639-650.
R. Kumar, et al. "Stochastic models for the web graph", FOCS 2000, 9 pages.
M. E. J. Newman, "The Structure of Scientific Collaboration Networks", PNAS, Jan. 16, 2001, pp. 404-409, vol. 98, No. 2.
M. Newman, et al. "Random Graphs with Arbitrary Degree Distributions and their Applications", Physical Review E, 2001, 17 pages, vol. 64.
D. Osthus, et al. "Popularity Based Random Graph Models Leading to a Scale-free Degree Distribution", pp. 1-24.
D. Watts, et al. "Collective dynamics of 'small world' networks", Nature, Jun. 4, 1998, pp. 440-442, vol. 393.
S.N. Dorogovtsev, et al. "Evolution of random networks", Adv Phys 2002, Mar. 6, 2001, pp. 1079-1187, vol. 51.
P. Erdos, et al. "On Random Graphs", Publicationes Mathematicae, 1959, pp. 290-297, vol. 6.
P. Erdos, et al. "On the evolution of random graphs", Public Mathematical Institute of Hungary Academy of Sciences, 1960, pp. 17-61, vol. 5.
K. Azuma, "Weighted sums of certain dependent variables", Tohoku Mathematical Journal, 1967, pp. 357-367, vol. 19, No. 3.
B. Bollobas, "Martingales, isoperimetric inequalities and random grapsh", in Combinatorics (Eger, 1987), pp. 113-139.
E. N. Gilbert, "Random Graphs", The Annuals of Mathematical Statistics, Dec. 1959, pp. 1141-1144, vol. 30, No. 4.
W. Hoeffding, "Probability inequalities for sums of bounded random variables", Journal of the American Statistical Association, 1963, pp. 13-30, vol. 58.
B. Bollobas, "Random Graphs, Second Edition" Cambridge University, 2001, pp. 1-17.
B. Bollobas, "Random Graphs, Second Edition" Cambridge University, 2001, pp. 18-52.
B. Bollobas, "Random Graphs, Second Edition" Cambridge University, 2001, pp. 53-87.
B. Bollobas, "Random Graphs, Second Edition" Cambridge University, 2001, pp. 88-122.
B. Bollobas, "Random Graphs, Second Edition" Cambridge University, 2001, pp. 123-157.
B. Bollobas, "Random Graphs, Second Edition" Cambridge University, 2001, pp. 158-192.
B. Bollobas, "Random Graphs, Second Edition" Cambridge University, 2001, pp. 193-227.
B. Bollobas, "Random Graphs, Second Edition" Cambridge University, 2001, pp. 228-257.
B. Bollobas, "Random Graphs, Second Edition" Cambridge University, 2001, pp. 258-292.
B. Bollobas, "Random Graphs, Second Edition" Cambridge University, 2001, pp. 293-327.
B. Bollobas, "Random Graphs, Second Edition" Cambridge University, 2001, pp. 328-362.
B. Bollobas, "Random Graphs, Second Edition" Cambridge University, 2001, pp. 363-399.
B. Bollobas, "Random Graphs, Second Edition" Cambridge University, 2001, pp. 400-449.
B. Bollobas, "Random Graphs, Second Edition" Cambridge University, 2001, pp. 450-498.
Rodgers, et al.; Properties of a growing random directed network; European Physical Journal, pp. 1-13; 2001.
Aiello, et al.; Random evolution in massive graphs, Proc. FOCS, pp. 1-39, 2001.
Bela Bollabas, et al., Directed Scale-Free Graphs, Proceedings of the fourteenth annual ACM-SIAM symposium on Discrete algorithms, 2003, pp. 132-139, Baltimore, Maryland.
Linyuan Lu, et al., The Diameter of Random Massive Graphs, Proceedings of the twelfth annual ACM-SIAM symposium on Discrete algorithms, 2001, pp. 912-921, Washington, D.C., United States.
William Aiello, et al., A Random Graph Model for Massive Graphs, STOC'2000, 2000, pp. 1-10, Oregon, Portland.
Bollobas, et al., "Chapter 1: Mathematical Results on Scale-Free Random Graphs, In: Handbook of Graphs and Networks: From the Genome to the Internet", Feb. 3, 2003, pp. 1-34.
Chakrabarti, et al., "Graph Mining: Laws, Generators, and Algorithms", ACM Computing Surveys, vol. 38, Mar. 2006, pp. 1-69.
Kiyomitsu, et al., "Access Management for Dynamic Web Contents Based on User's Navigation over Hyertext Documents", Technical Report of IEICE, vol. 99, No. 201, The Institue of Electronics, Information and Communication Engineers, Japan, Jul. 21, 1999, pp. 85-90.
Krapivsky, et al., "Degree Distributions of Growing Networks", Physical Review Letters, vol. 86, No. 23, Jun. 2001, pp. 5401-5404.
Yan, et al., "Random Edge Deletion in Directed Scale-Free Graphs", Proceedings of 2009 International Conference on Networks Security, Wireless Communications and Trusted Computing, Apr. 25-26, 2009, pp. 52-55.
Zhang, et al., "Fast Generation of Scale Free Networks with Directed Arcs", Computer Performance Engineering, Proceedings of the 6th European Performance Engineering Workshop, (EPEW 2009), Jul. 9-10, 2009, London, UK, Lecture Notes in Computer Science, vol. 5652, pp. 131-148.

* cited by examiner

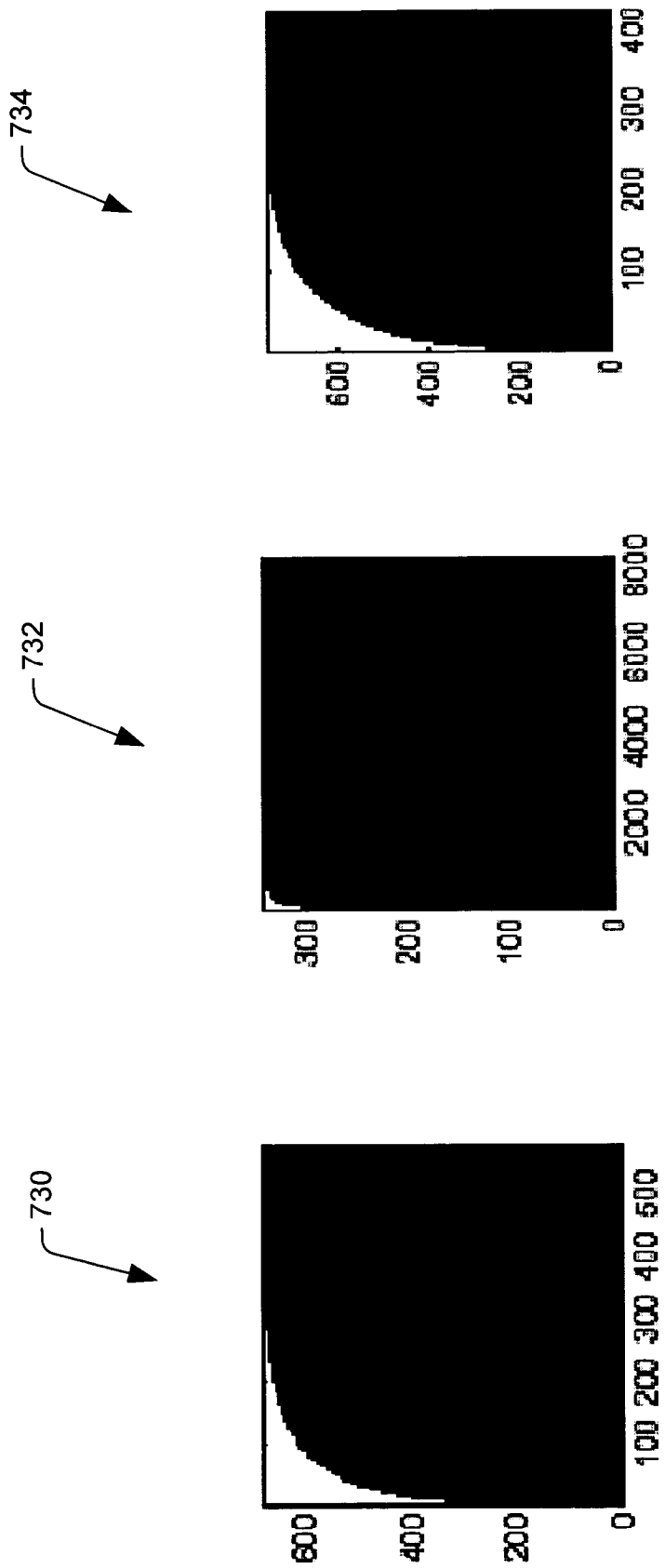

NEWS GROUP CLUSTERING BASED ON CROSS-POST GRAPH

TECHNICAL FIELD

The present invention relates to organizing newsgroups via clustering. More particularly, the invention relates to a system and method which utilizes cross-posts to cluster newsgroups.

BACKGROUND OF THE INVENTION

Self-organized structures (e.g., networks) have gained tremendous popularity over recent years, and such networks poses a significant challenge as to understanding respective constructs thereof. The networks (e.g., the Internet, world wide web, various social networks . . . ) can be very different from each other, but they all typically share a commonality in that their structures are not engineered, but rather are a result of dynamic non-Markovian processes of individual decisions. Understanding the respective structures of these networks can facilitate enabling modeling of as well as searching the networks effectively—the greatest success thus far has been in searching the world wide web, which has now become a primary repository of information and/or misinformation.

Internet newsgroups (e.g., Usenet) is another large network intermediate to the Internet and social networks. Usenet, the network of topic-oriented newsgroups on the Internet, comprises tens of thousands of newsgroups and hundreds of millions of postings by millions of authors throughout the world. Some basic workings of Usenet are as follows: each of over fifty thousand newsgroups has a unique name, with the name grouped into trees—some of the more common roots of these trees include alt., biz., and rec. Within a newsgroup, the messages are organized as threads. Each message is typically generated by a single author; individuals may author more than one message along a thread. Each thread originates in a single message with a subject heading usually reflecting the content of the message; later messages in the thread, of which there can be thousands, are posted as responses to the original message. Any message along a thread can be cross-posted (e.g., by its author) to any number of additional newsgroups.

Newsgroups facilitate transfer of information and ideas on topics specific to each individual newsgroup. For example, a user interested in gaining travel tips prior to traveling to a country (e.g., Africa) can enter a newsgroup specifically created and operated to discuss such information (rec.travel.africa). There are currently thousands of newsgroups that cover nearly every topic imaginable. When properly utilized, newsgroups can provide for a user to submit highly specific queries and obtain answers thereto, wherein oftentimes such answers are only available from a very limited set of disparate individuals or entities.

Presently, however, it is difficult to quickly locate a particular newsgroup relevant to a specific topic of desire. Even if a newsgroup, that appears to be on-point to a topic, is located by a user, such a newsgroup may not be currently active or may comprise information not germane to the particular topic of interest—thus, not really being on-point. Internet search engines are typically employed to locate newsgroup(s) which relate to information or discussion for a particular topic of interest. However, oftentimes, the search engines return newsgroups with low precision (e.g., non-relevant), due in part to such engines being primarily limited to employment of textual-based searching schemes. For example, if a user desires to join a newsgroup that discusses travel to Africa and enters keywords "travel" and "Africa" to a search engine, he/she may receive an exact desired newsgroup, but the search engine may just as likely return newsgroups focusing on irrelevant respective content (e.g., sports, politics . . . ).

Undesirable results can occur because a conventional search engine typically only ranks the newsgroups based on some pre-determined criteria. The search engine may rank newsgroups according to number of times that both "Africa" and "travel" appear in discussion of the newsgroups. Therefore, if the discussion in a sports newsgroup and a political newsgroup is focused on a sports figure traveling to Africa and/or a political figure traveling to Africa, respectively, they will be ranked highly when the search engine returns newsgroups from the search query, even though the user has no desire to discuss either sports or politics.

In view of at least the above, there exists a strong need in the art for a system and/or methodology to facilitate improved searching and organization of newsgroups.

SUMMARY OF THE INVENTION

The following presents a simplified summary of the invention in order to provide a basis understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention facilitates locating and/or organizing newsgroups, and overcomes many of the aforementioned deficiencies related to conventional systems for searching newsgroup-related information. The invention takes advantage of a realization by inventors of the subject invention that cross-postings between newsgroups can be indicative of degree of relatedness among respective newsgroups. As such, the subject invention provides for constructing a weighted graph of newsgroups utilizing cross-posting information. Such a weighted graph can be further refined via pre-processing, post-processing, segmenting schemes, and/or filtering schemes. The weighted graph can facilitate locating and/or understanding respective relationships of newsgroups.

Newsgroup(s) cross-postings are in a sense analogs of hyperlinks of a webpage, which reflect a webpage author's judgment that additional web pages may be of interest to readership of an original webpage. Cross-posts are employed via the subject invention as an indication for similarity between topics discussed in newsgroups or an interaction between related communities. A graph in accordance with the subject invention that is defined in part via cross-posts provides a mechanism that greatly facilitates understanding newsgroup(s) structure as well as exploiting such structure to enhance navigation thereof.

One particular aspect of the invention provides for creation of the weighted graph. Newsgroup data is received, which includes but is not limited to data indicating identification of newsgroups, number of postings within newsgroups, and number of cross-posting between newsgroups. The data can be obtained from a database, hard drive, Internet search engine, etc. Cross-postings refer to the posting(s) of a same message to more than one newsgroup (e.g., similar to a group email). The number of cross-postings between newsgroups indicates the degree of relatedness between newsgroups, and thus provides structural constructs for generating a weighted graph. The newsgroup data can be organized in matrices and arrays, wherein an array can indicate the number of newsgroups available on a network at a given time, and a second symmetrical matrix can indicate the number of cross-postings between newsgroups. Matrices and arrays can comprise newsgroups and newsgroup related data in any arbitrary but fixed order, thus facilitating efficient creation of a weighted graph.

A weighted graph is created based upon the newsgroups cross-postings, wherein the newsgroups are represented as vertices and the cross-posts are represented as edges of the weighted graph. The graph can facilitate analysis of newsgroup clusters, as a user can visually determine from the graph which newsgroups are most related. Moreover, the weighted graph can be employed via a search engine to provide meaningful results in connection with a query for newsgroup(s) related to a particular item of interest.

With respect to another aspect of the present invention, the weighted graph can be partitioned into small clusters, wherein a cluster contains a plurality of newsgroups which are highly related to one another. In other words, the newsgroups of a first cluster can be related by a number of internal cross-postings among them that is greater than the number of cross-posting between newsgroups of the first cluster and newsgroups of another cluster. Thus, the degree of relatedness of newsgroups within the first cluster is higher than that for newsgroups outside the first cluster. The present invention thus overcomes some of the deficiencies of prior art systems that do not provide for grouping of newsgroups.

The weighted graph can be clustered via a spectral clustering algorithm, for example. The spectral clustering algorithm can be applied recursively to the weighted graph, to provide for modifying results without executing the algorithm over an entire data set repeatedly. Also, segmented clusters can be merged in accordance with another particular aspect of the present invention as part of a post-processing aspect of the invention. If weights of edges between two or more clusters are sufficiently large, the clusters can be merged into a larger cluster so as to correct for undesired segmentation resulting from the approximation-based nature of the clustering algorithm.

With respect to another particular aspect of the invention, the data can be filtered prior to being graphed, so as to facilitate removing irrelevant data prior to constructing the weighted graph thereby optimizing utilization of processing bandwidth as well as providing for a more useful weighted graph in that better respective data is employed to build the graph. Newsgroups can be filtered when they do not contain a threshold of postings, as newsgroups with low postings are indicative of a low level of interest in the topic. Furthermore, edges of low weight can be pared, as a small number of cross-postings between newsgroups indicate that the newsgroups are not related. Moreover, isolated newsgroups or subsets of newsgroups can be excluded from the weighted graph, as isolation would indicate a very specific interest or a low-interest newsgroup.

The results from the weighted cluster graph can either be returned as final output or can be used as input to other processing components such as search engines, newsgroup browsers or email programs. For example, if an email program were used to post a response to a newsgroup message, the program could suggest to the user that the message be cross-posted to all newsgroups in a cluster containing the original newsgroup. Or, as another example, a search engine could use the weighted cluster graph (e.g., represented as a matrix, database, vectors, . . . ) in connection with executing a newsgroup search and providing results in response thereto.

Moreover, final output results from the weighted cluster graph can be output to a printer, monitor, floppy disk, CD, DVD, hard drive, etc. The results can be displayed graphically or textually. For example, if an Internet search engine were utilized to locate a newsgroup, a weighted cluster graph created in accordance with the present invention could be displayed to the user to facilitate user analysis of the clusters.

To the accomplishment of the foregoing and related ends, the invention then comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

BRIEF DESCRIPTION OF THE DRAWINGS

FIGS. 7A-7C are graphical depictions of cluster size results utilizing different stopping algorithms.

DETAILED DESCRIPTION OF THE INVENTION

Figure 1:
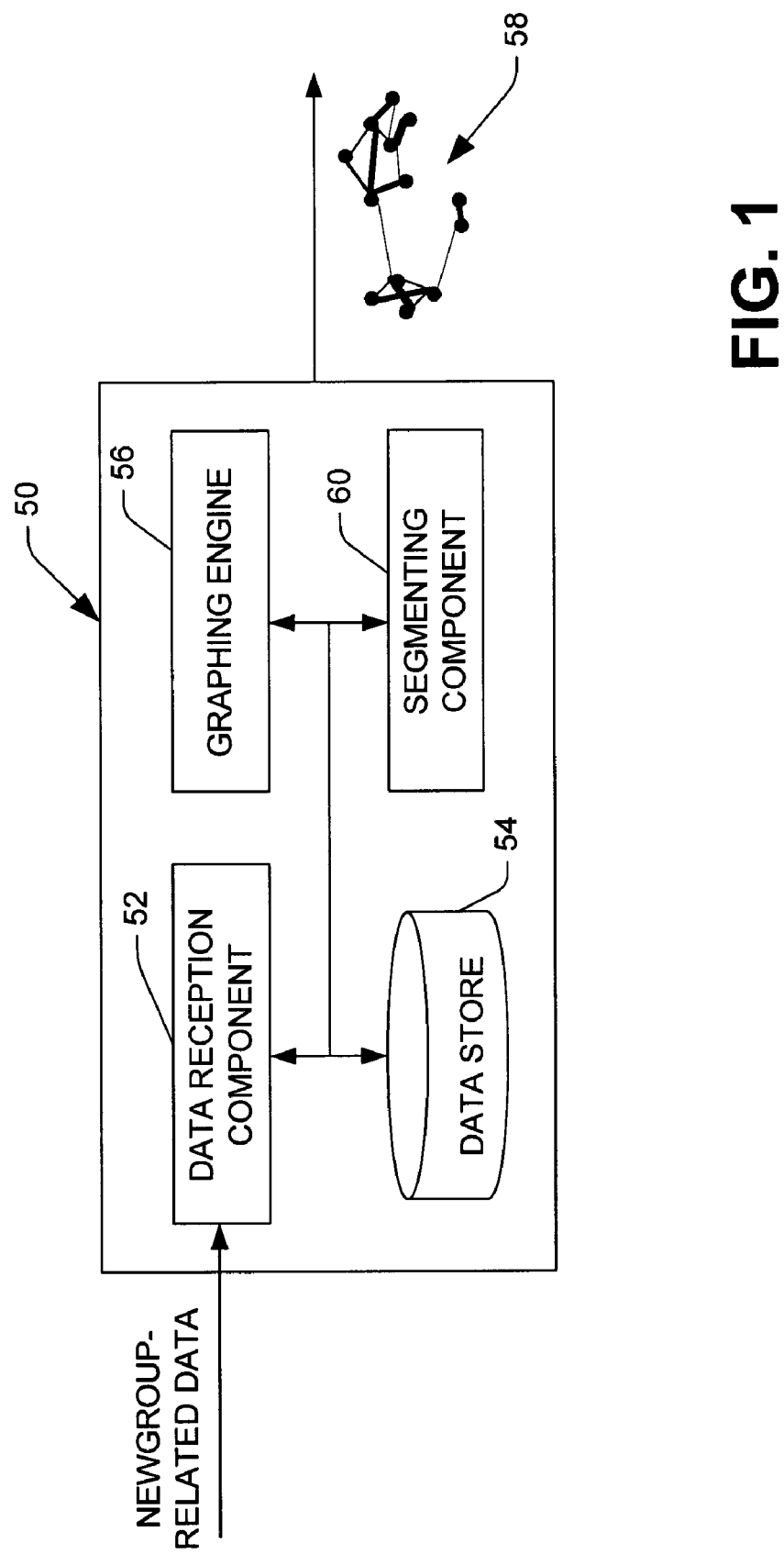
FIG. 1 is a block diagram of a cluster graphing system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers.

Referring now to the drawings, FIG. 1 illustrates a high-level system overview in connection with one particular aspect of the subject invention. The subject invention relates to a novel system 50 for generating a weighted cluster graph of newsgroups utilizing cross-posting information. The weighted cluster graphing system 50 comprises a data reception component 52 that facilitates reception of newsgroup related data. Such data can include but is not limited to number of posts within newsgroup(s), dates and times of each posting, number of cross-post(s) within a newsgroup(s), corresponding newsgroup(s) conjointly comprising such cross-post(s), authors of each individual post and cross-post, subject lines of each individual post and cross-post, and number of cross-post(s) between two newsgroups. Cross-posting occurs when an identical message is simultaneously posted within more than one user-specified newsgroup. The data reception component 52 can receive newsgroup formatted in any suitable manner (e.g., data contained in matrices, vectors, XML data, . . . ). Furthermore, the data reception component 52 can be employed to recognize newsgroup data, wherein data not relating to newsgroups is discarded.

According to one particular aspect of the present invention, the data reception component 52 can receive matrices and arrays comprising newsgroup data. Alternatively, the data reception component 52 can facilitate organization of data into matrices, thus effecting efficient computation of data. For example, newsgroups can be organized in an array or matrix N, wherein the number of rows or columns of N corresponds to the number of newsgroups contained within a network at a given time. The entries of N can indicate the number of postings within a newsgroup, number of authors posting to a newsgroup, etc. corresponding to such entry N. A symmetrical matrix P can be created, wherein the number of rows and columns of P is equivalent to the number of newsgroups of N. Matrix P can contain data relating to the number of cross-postings between newsgroups.

In particular, let n=n(t) be a number of newsgroups at time t. The cross-post matrix P=P(t, δt) is a symmetric n×n matrix, with each row representing a different newsgroup, in some arbitrary but fixed order. Non-negative integer components $P_{ij}$ of P represent a total number of cross-posts between all messages on newsgroup i and newsgroups j over time interval δt before time t. This information can be represented either as a multigraph (i.e., a graph in which there may be multiple edges between vertices) or as a weighted graph. In the multigraph representation, the vertices represent distinct newsgroups and the number of edges between i and j represent the total number of cross-postings between newsgroup i and newsgroup j. In the weighted graph representation, the vertices again represent distinct newsgroups and the weight of the edge between i and j represents the number of cross-postings between newsgroup i and newsgroup j.

In accordance with one aspect of the present invention, the data reception component 52 can be effectively coupled to a data store 54 within the system 50—the data store 54 can be employed to retain data previously received by the data reception component 52 as well as various algorithms (e.g., clustering algorithms), historical data, profiles, contextual data, content-based data, and any other suitable information for carrying out the present invention. The data store 54 can be any storage component capable of retaining computer data, such as a CD, DVD, hard drive, floppy disk, server database, etc. The data store 54 can be further employed to store any suitable data type (e.g., XML, HTML, data tables . . . ), and any other data type or structure can be retained in the data store 54 in accordance with one aspect of present invention.

Figure 2:
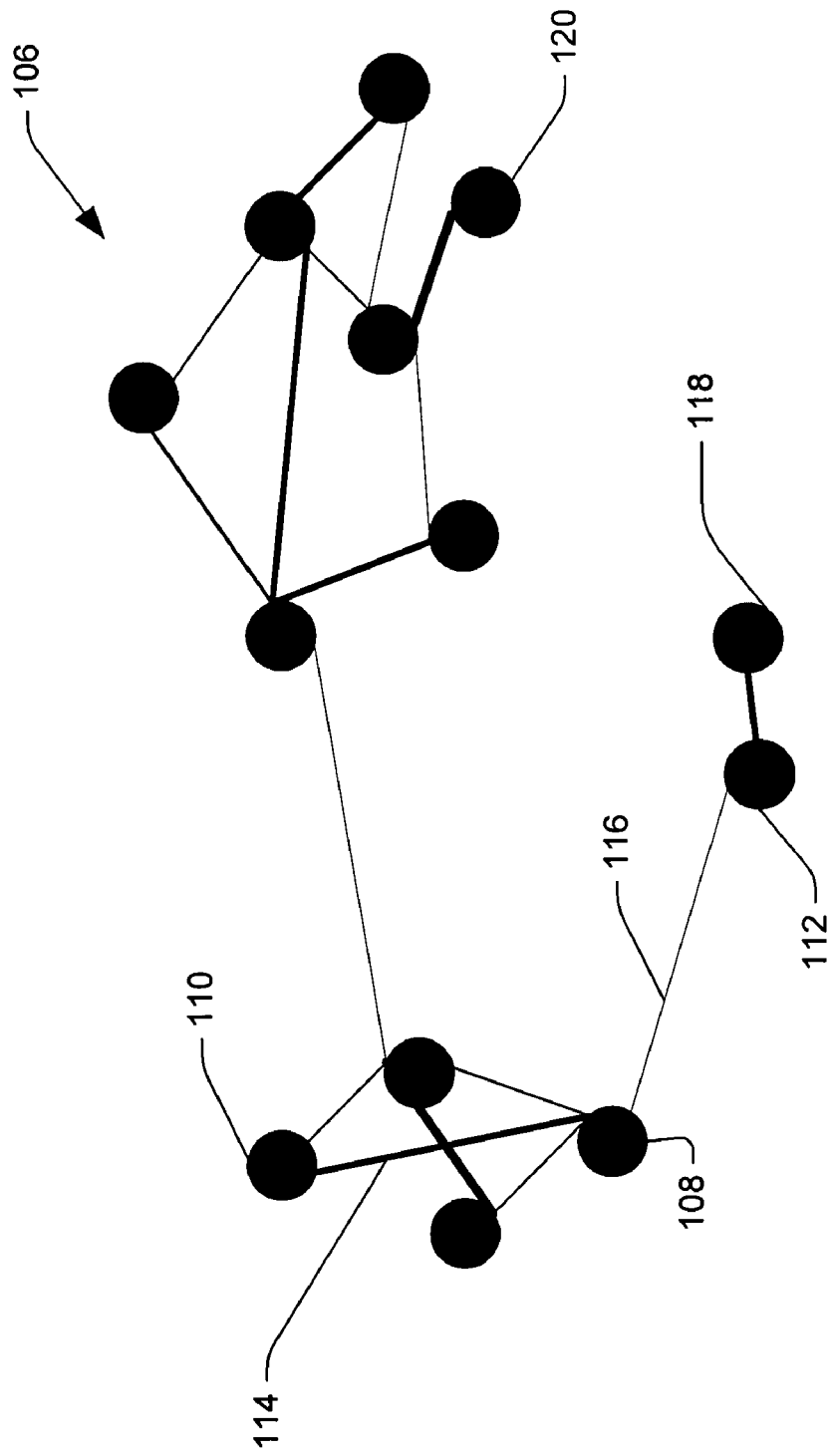
FIG. 2 is an exemplary weighted graph in accordance with an aspect of the present invention.

At least a subset of data received by the data reception component 52 and/or held in the data store 54 can be relayed to and/or from a graphing engine 56. The graphing engine 56 facilitates generation of a weighted graph relating to newsgroup data by utilizing data received by the data reception component 52 and/or contained within the data store 54, such that the graph depicts relatedness of two or more newsgroups. Specifically, the weighted graph is created based upon cross-postings between a plurality of newsgroups, as cross-postings between newsgroups are indicative of relatedness. For example, two newsgroups entitled "Travel to Africa" and "Travel by Air", respectively, will be related, as cross-posts regarding travel by air to Africa will be shared between both newsgroups. As cross-posting between two or more newsgroups increases numerically (or a percentage of cross-postings to total posts increases), relatedness between such newsgroups likewise increases. The graphing engine 56 can depict degrees of relatedness by representing newsgroups as vertices and cross-posts as edges of a weighted graph. An exemplary weighted graph 58 in accordance with one aspect of the present invention is illustrated in FIG. 2 and explained more fully below. The graph generated by the graphing component 56 can be relayed to the data store 54 for storage and/or display. As discussed infra, such weighted graph can be employed via search engine to substantially enhance newsgroup searching.

Turning briefly to FIG. 2, an exemplary weighted graph 106 representing newsgroup data in accordance with an aspect of the present invention is displayed, wherein newsgroups are represented as vertices and cross-posts are represented as edges. The terms "graph" and/or "graphical representation" used throughout this description are intended to refer not only to visual graph(s), but also to any suitable organized collection of data. For example, the term "graph" as used in the subject claims can refer to a matrix constructed in such a manner to indicate relatedness of newsgroups using cross-posts.

Increasing degrees of relatedness between vertices can be represented by increasing weights of edges connecting such vertices (e.g., thicker edges between vertices indicate more cross-posting between newsgroups). For example, more cross-posting exists between newsgroups 108 and 110 than between 108 and 112, visually illustrated by a thicker edge 114 between the newsgroups 108 and 110 as compared to edge 116 that connects newsgroups 108 and 112. No cross-posting exists between newsgroups 118 and 120, as no edge exists between such newsgroups.

The weighted graph 106 can be conveyed via any suitable manner (e.g., graphically displayed to a user, mathematically represented to a computing system, . . . ), or utilized for further modification and/or analysis thereof (e.g., in connection with a newsgroup search). It is to be understood that the illustrated weighted graph 106 is merely exemplary, and is not meant to be limiting in any manner as other embodiments of weighted graphs as well as other means for representing relatedness of newsgroups via utilization of cross-posting information are contemplated and intended to fall within the scope of the hereto appended claims. For example, an edge line can exist for each cross-posting (rather than increasing edge weights as cross-postings between newsgroups increase). Furthermore, vertices can be any suitable shape, and can be weighted to indicate a number of postings within each newsgroup (e.g., vertices representing newsgroups can be larger and/or varying in color as the number of newsgroup postings increase or decrease). Moreover, weighted graph 106 can be a 3-dimensional graph, resulting in a more visually appealing graph during instances that a large number of newsgroups are considered. The weighted graph can also be represented numerically as well if desired.

Returning to FIG. 1, the system 50 can further comprise a segmenting component 60, which facilitates segmentation of the weighted graph into clusters of highly related newsgroups. Grouping of the newsgroups via clustering facilitates improved organization and searching thereof as compared to conventional systems and/or methods of organizing and searching newsgroups and newsgroup related data. Individual clusters and/or weighted graphs not modified by segmenting component 60 can be relayed to the data store 54 for storage and/or display. The segmenting component 60 can employ various clustering algorithms to facilitate determination of segmentation locations between vertices of a weighted graph, wherein such segmentation provides for disassociation between substantially unrelated newsgroups. The clustering algorithms can be traditional clustering algorithms, such as k-median, or any other suitable clustering algorithm(s) for carrying out the subject invention. In one embodiment, the segmenting component 60 employs spectral clustering algorithms to partition the graph into clusters of a desirable size, such clusters comprising substantially related newsgroups. Spectral clustering algorithms and the segmenting component 60 are discussed in greater detail below. It is to be appreciated the invention contemplates use of any suitable clustering algorithm(s) for segmentation of clusters.

In accordance with one aspect of the present invention, the system 50 can be part of a search engine that employs the weighted graph in connection with searching newsgroups. For example, a search for newsgroups discussing a particular topic can be initialized by entering search terms into the system 50. The data reception component 52 can facilitate deliverance of newsgroup data to the graphing engine 56 and/or data store 54, thereby in connection with generating a weighted graph having newsgroups as vertices and cross-posts as edges. The graphing engine 56 can be employed to relay such weighted graph to the data store 54 for storing and/or displaying. Furthermore, the graphing engine 56 can relay the weighted graph to the segmenting component 60, which facilitates segmentation of the graph into clusters of highly related newsgroups. The system 50 can return clusters of relevant newsgroups to a user as part of results to a query for newsgroups corresponding to topic(s) of interest. Furthermore, the system 50 can be employed in accordance with searching newsgroups relating to sale of goods and/or services (e.g., auction-related newsgroups, newsgroups containing classified listings, . . . ). For example, cross-postings between newsgroups employed to facilitate sale of goods and/or services can be indicative of type of goods and/or services being sold. The system 50 can facilitate clustering of such newsgroups, thereby enabling a buyer and/or seller of goods and/or services to quickly access most germane newsgroups.

In accordance with another aspect of the present invention, the data delivered to and/or relayed from the data reception component 52 can be filtered to decrease size of a data set relating to newsgroups, thus reducing computation time required to create a weighted graph. The data set can be filtered by removing newsgroups with insufficient postings, removing newsgroups with insufficient cross-postings, through artificial intelligence means, or any other suitable means for pruning a superset of data to more relevant subset(s) that can be employed by the graphing engine 56 to generate a meaningful weighted graph.

The system 50 can employ various inference schemes and/or techniques in connection with filtering undesirable newsgroups. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

Figure 3:
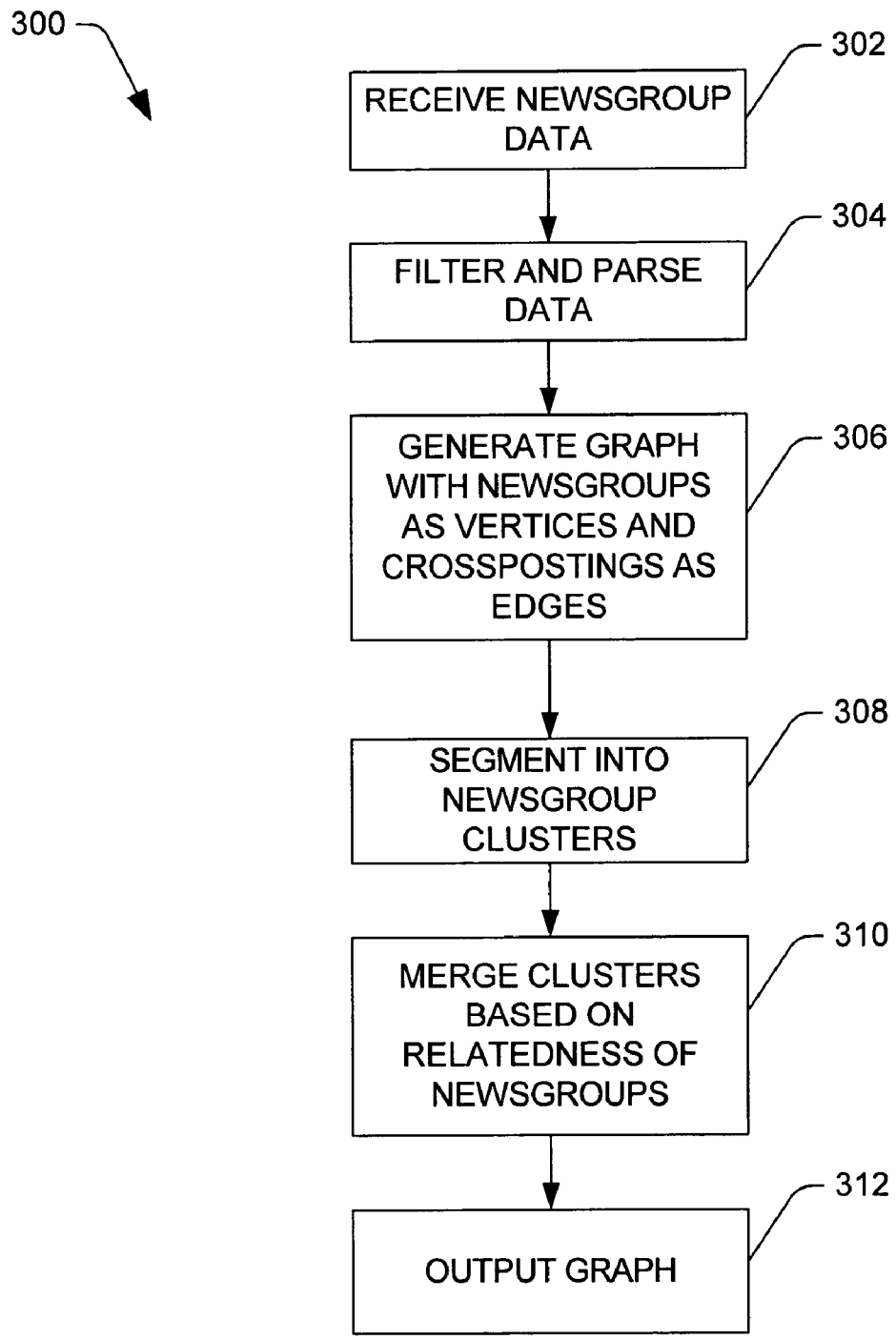
FIG. 3 is a representative flow diagram illustrating creation of a weighted cluster graph in accordance with an aspect of the present invention.

Turning now to FIG. 3, a method 300 for creating a cluster graph of newsgroups is illustrated. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

The discussing of the methodology is supplemented with source code in accordance with one particular implementation of the present method so as to facilitate understanding of the subject method. Any suitable program/language can be employed in connection with the invention—accordingly, the invention is not limited to any particular program and/or language (e.g., Matlab). It is to be appreciated that the method of FIG. 3 is not limited to such particular implementation and that any suitable means for carrying out the various described acts can be employed and are intended to fall within the scope of the hereto appended claims. The following variables and functions are defined for each portion of the source code.

N is an n×3 array, wherein each row of N contains three numbers indicating identification of a newsgroup, number of posts to each newsgroup over a certain period of time, and number of authors who have posted a message to such newsgroup over such period of time.

E is an m×3 array. Each row of E contains identification of two newsgroups and number of cross-posts there between.

id and name are two n×1 arrays. Entry i of array id is the identification of a newsgroup, whose name is stored in entry i of array name.

At 302, newsgroup data is received (e.g., via a data storage device such as a server database, compact disk, DVD, floppy disk, hard drive, etc., by manually entering data, or any other method of retrieving and/or receiving data). The newsgroup data can include but is not limited to the number of newsgroups, a way to identify each newsgroup, number of posts in each newsgroup, number of cross-posts in each newsgroup, data identifying all newsgroups which contain each cross-post, and number of authors posting to each newsgroup. In the exemplary source code, all necessary data has been previously retrieved and stored in arrays N, E, id, and name.

At 304 the newsgroup data retrieved is filtered to exclude newsgroups and corresponding data that contain too few posts, posts from too few authors, or are irrelevant to the user given a particular user's identity, state, and context. Inference techniques can be utilized to determine whether newsgroup data received is relevant given a particular user. Furthermore, edges are removed if edge weight does not meet a certain threshold (e.g., if there are not enough cross-posts between two newsgroups, corresponding edges connecting vertices representing such two newsgroups are eliminated). It is to be understood that although the exemplary code filters newsgroups and eliminates edges adjacently, the present invention can be modified to filter undesirable newsgroups prior to reception of data and to pare insufficient edges after creation of a weighted graph. In the exemplary code in accordance with one aspect of the present invention, the newsgroups are filtered which contain less than 100 posts over a period of one year, and edges between vertices are pared when less than five cross-posts are shared between corresponding news groups over a period of one year.

```
[numcomp, compsize, comp, giantcomp, A] = preproc(N, E);
[cluster, rep, father] = findclusters(A);
[cluster] = postproc(A, cluster);
writeclusters(A, cluster, giantcomp, N, id, name, 'clusters.txt');
function [numcomp, compsize, comp, giantcomp, A] = preproc(N, E)
minposts = 100;
minxpost = 5;
n = max(N(:,1));
E = E(find(E(:,3)>minxpost),:);
E = sortrows(E,1);
```

```
-continued a = zeros(size(E,1),1);
deg = zeros(n,1);
a(1) = 1;
for i = 2:size(E,1),
    if (E(i,1) == E(i-1,1)),
        a(i) = a(i-1) + 1;
    else
        a(i) = 1;
        deg(E(i-1,1)) = a(i-1);
    end;
end;
deg(E(size(E,1),1)) = a(size(E,1));
AdjList = sparse(E(:,1),a,E(:,2));
ImportantNodes = N(find(N(:,2)>minposts),1);
isimportant = zeros(n,1);
isimportant(ImportantNodes) = 1;
visited = zeros(n,1);
numcomp = 0;
for ii=1:size(ImportantNodes,1),
    i = ImportantNodes(ii);
    if (deg(i) > 0 & visited(i) == 0)
        count = 1;
        clear('current');
        current(1) = i;
        visited(i) = 1;
        ptr = 1;
        while (ptr <= count)
            u = current(ptr);
            for j=1:deg(u),
                if (visited(AdjList(u,j)) == 0 &isimportant(AdjList(u,j)) == 1)
                    count = count + 1;
                    current(count) = AdjList(u,j);
                    visited(AdjList(u,j)) = 1;
                end;
            end;
            ptr = ptr + 1;
        end;
        if (count > size(ImportantNodes,1)/2)
            giantcomp = current;
        else
            numcomp = numcomp + 1;
            compsize(numcomp,1) = count;
            comp(numcomp,1:count) = current(1:count);
        end;
    end;
end;
end;
```

At 306 a weighted graph is created, with newsgroups represented as vertices and cross-posts represented as edges. Weights of edges connecting vertices are indicative of the number of cross-posts between newsgroups that such vertices represent. Moreover, a weighted graph can include weighted vertices, wherein such vertex weights indicate the number of postings within a newsgroup (e.g., newsgroups with several hundred postings will be represented by larger vertices when compared to vertices representing newsgroups with fewer postings). The source code in accordance with one aspect of the present invention simulates generation of a graph by constructing an adjacency matrix of the graph, thus indicating the weight of edges between all vertices.

A1=sparse(E(:,1), E(:,2), E(:,3));
A=A1 (giantcomp,giantcomp);

Then at 308 a weighted graph is recursively segmented into clusters of desirable size.

```
function [S1, S2, value, rep] = findcut(A, v2)
L = 100;
L2 = 50;
n = size(A,1);
if n == 1,
    value = Inf;
    rep = 1;
```

```
    return;
end;
rowsum = sum(A,2);
total = full(sum(rowsum));
S1 = find(rowsum==0);
if size(S1(:),1) > 0,
    value = 0;
    S2 = find(rowsum~=0);
    if size(S2(:),1)==0,
        rowsum(1)=1;
        S1 = find(rowsum==0);
        S2 = find(rowsum~=0);
    end;
    rep = S2(1);
    return;
end;
if nargin < 2,
    D = diag(sum(A));
    [V, lambda] = eigs(D.^(-0.5)*A*D.^(-0.5), 2, 'lr');
    if (lambda(1,1) < lambda(2,2)),
        v1 = V(:, 2);
        v2 = V(:, 1);
    else
        v2 = V(:, 2);
        v1 = V(:, 1);
    end;
    v2 = D.^(-0.5) * v2;
    if (sum(v2) < 0), v2 = -v2; end;
    if (sum(v1) < 0), v1 = -v1; end;
    [temp rep] = max(v1);
end;
maxv = max(v2); minv = min(v2);
step = (maxv - minv) / L;
ratio = zeros(0, 2);
last = 0;
for i = 0:L-1,
    S1 = find(v2 <= minv + step*i);
    if size(S1(:),1) > last,
        S2 = find(v2 > minv + step*i);
        aS = sum(rowsum(S1));
        cut = full(aS-sum(sum(A(S1, S1))));
        if cut == 0,
            Mcut = 0;
        else
            WS = (aS - cut) / 2;
            WCS = (total - aS - cut) / 2;
            Mcut = cut/WS + cut/WCS;
        end;
        ratio(end+1,:) = [minv + step*i, Mcut];
        last = size(S1(:),1);
    end;
end;
[value i] = min(ratio(:,2));
[T I] = sort(v2);
j = max(find(T <= ratio(i,1)));
ratio = zeros(0,2);
for i = max(1,j-L2):min(n-1,j+L2),
    S1 = I(1:i);
    aS = sum(rowsum(S1));
    cut = full(aS-sum(sum(A(S1, S1))));
    if cut == 0,
        Mcut = 0;
    else
        WS = (aS - cut) / 2;
        WCS = (total - aS - cut) / 2;
        Mcut = cut/WS + cut/WCS;
    end;
    ratio(end+1,:) = [i, Mcut];
end;
[value i] = min(ratio(:,2));
S1 = I(1:ratio(i,1)); S2 = I(ratio(i,1)+1:n);
function [cluster, rep, father] = findclusters(A)
cluster(1:size(A,1)) = 1;
numcluster = 1;
next = 1;
father = zeros(5000,1);
rep = zeros(5000,1);
while (next <= numcluster),
    CurrentCluster = find(cluster == next);
    if size(CurrentCluster(:),1) >= 2,
        [S1, S2, mcut(next), repindex] = findcut(A(CurrentCluster, CurrentCluster));
        rep(next) = CurrentCluster(repindex);
        threshold = (size(CurrentCluster(:),1)^0.5)/30;
        if mcut(next) < threshold,
            cluster(CurrentCluster(S1)) = numcluster + 1;
            cluster(CurrentCluster(S2)) = numcluster + 2;
            father(numcluster + 1) = next;
            father(numcluster + 2) = next;
            numcluster = numcluster + 2;
        end;
    end;
    next = next + 1;
end;
```

At 310, two or more resulting clusters after segmentation are merged if such clusters are substantially related to one another. Relatedness of two or more clusters can be determined by reviewing weighted edges between two clusters. Merging two separate clusters when summation of weights of edges between a first cluster and a second cluster is greater than half of the summation of weights of edges adjacent to such first cluster is one exemplary manner facilitating determination of instances that merging two clusters is appropriate. The method can merge two clusters A and B when $$\alpha(A, B) \geq \frac{1}{2}\alpha_A,$$

where $\alpha(A, B) = \Sigma_{i \in A}\Sigma_{j \in B}\alpha_{ij}$ is the partition between A and B, $\alpha_A = \Sigma_{i \in A}\Sigma_j \alpha_{ij}$ is the total number of edges beginning in A (regardless of whether they end inside or outside of A), and $\alpha_{ij}$ are the entries of the adjacency matrix constructed at 306. The below code illustrates one particular implementation for such merging.

```
function [newcluster] = postproc(A, cluster)
[R, I] = reducegraph(A, cluster);
n = size(R,1); % n = number of clusters
change = 1;
while (change),
    change = 0;
    for i = 1:n,
        [m, j] = max([R(i, 1:i-1) R(i, i+1:n)]);
        if (m > sum(R(i,:))/2)
            R(j, :) = R(j, :) + R(i, :);
            R(:, j) = R(:, j) + R(:, i);
            R(i, :) = 0;
            R(:, i) = 0;
            cluster(find(cluster==I(i))) = I(j);
            change = 1;
        end;
    end;
end;
newcluster = cluster;
```

Then, at 312 a weighted graph or substantially equivalent results are output to a user or relayed to a data store. Graphical results can be output to a monitor, printer, disk, hard drive, etc. Furthermore a resulting weighted cluster graph can be output to a user graphically or textually. In an instance of a search engine utilizing method 300, output newsgroup clusters can be displayed in hyperlink format, thus directing a user to a selected newsgroup or cluster of newsgroups. The method can store output results in a file on a hard drive, floppy disk, DVD, such as for example via the code below. Alternatively, the method can use the results as input to another processing component, such as a search engine, newsgroup browser, email program, etc.

```
function writeclusters(A, cluster, giantcomp, N, id, name, filename)
rowsum = sum(A,2);
total = sum(rowsum);
clustersize = histc(cluster, 1:max(cluster));
if nargin < 6, filename = 'clusters.txt'; end;
fid = fopen(filename,'w');
for i = 1:max(cluster), i,
    S = find(cluster == i);
    clsize = size(S(:),1);
    if clsize > 0,
        aS = sum(rowsum(S));
        cut = aS-sum(sum(A(S, S)));
        ratio = full(cut / min(aS, total - aS));
        [S1, S2, mcut, rep] = findcut(A(S,S));
        fprintf(fid, 'Cluster #%d:\n', i);
        fprintf(fid, ' Size = %d\n', clsize);
        fprintf(fid, ' Representative = %s\n',
        char(name(find(id == giantcomp(S(rep))))));
    fprintf(fid, ' Ratio of the cut defined by this cluster = %f\n', ratio);
        fprintf(fid, ' M-cut value of the best cut found inside this
        cluster = %f\n\n', mcut);
        for j=1:clsize,
            u = S(j);
            uid = giantcomp(u);
            nm = char(name(find(id == uid)));
            k = find(N(:,1) == uid);
            fprintf(fid, '\t %s (%d posts, %d authors)\n', nm, N(k,2), N(k,3));
        end;
        fprintf(fid, '\n');
    end;
end;
fclose(fid);
```

Figure 4:
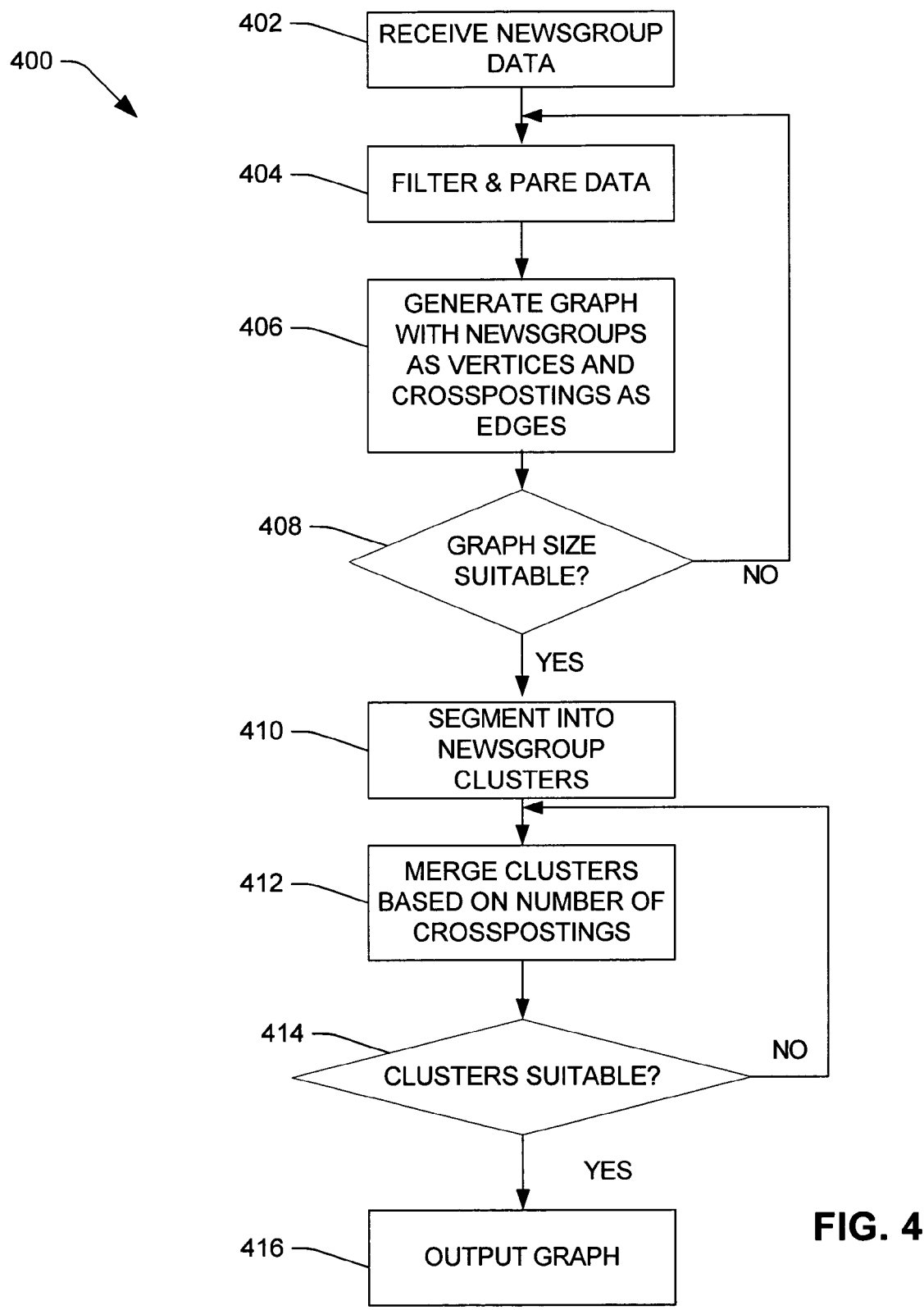
FIG. 4 is a representative flow diagram illustrating creation of a weighted cluster graph in accordance with another aspect of the present invention.

Now turning to FIG. 4, a method 400 of clustering news group data in accordance with one aspect of the present invention is illustrated. At 402, data regarding newsgroups is received—the data can be received via any suitable manner in accordance with the subject invention. At 404, such newsgroup data is filtered and pared. A subset of newsgroups are removed from the data received at 402 in instances where such newsgroups do not contain sufficient posts. The filtering and/or paring can employ artificial intelligence-based techniques, for example, to determine that certain newsgroups are not relevant to a particular user given a user state, context and other extrinsic information. Cross-posts are removed from newsgroup data when insufficient cross-posting exists between two or more newsgroups. While FIG. 4 indicates that newsgroup data is pared prior to generation of a weighted graph, it is understood that paring newsgroup data after a weighted graph is generated is within the scope of the invention. Newsgroup data can be pared after a weighted graph has been generated by simply removing edges with insufficient weight. Filtering and paring newsgroup data will result in a reduced data set to be graphed and segmented.

At 406 a weighted graph is generated—it is to be appreciated that formatting data in such a manner to substantially create a weighted graph is sufficient. For example, one could choose to create an adjacency matrix and still fall within the scope of the invention. At 408, size of a generated weighted graph is compared with a threshold. If the size of a weighted graph is greater than such threshold, the weighted graph can be subjected to further filtering and paring to facilitate reduction of size of such weighted graph to reach a suitable size. It should be noted that filtering and paring an extensive amount of newsgroup data could possibly bias remaining data during weighted graph segmentation. Moreover, the present invention can be employed to determine whether newsgroup data is to be additionally filtered and pared prior to generation of a weighted graph. For example, directly after initially filtering newsgroup data, the size of remaining newsgroup data following filtering can be compared with a threshold. If the size of the remaining subset of newsgroup data is greater than such threshold, more filtering can be done prior to generation of a weighted graph.

At 410, a weighted graph is recursively segmented into clusters of suitable size. Segmenting a weighted graph is discussed in greater detail infra. At 412, clusters created via segmentation are reviewed to determine whether merging two cluster would be beneficial. At 414, remaining clusters are reviewed to determine if cluster size and quality are acceptable. If one or more clusters are not of a sufficient size, they can be merged into another cluster with which they have substantial relation based upon the number of cross-postings between such two clusters. At 416, results of a weighted graph or substantial equivalent thereof are output.

Figure 5:
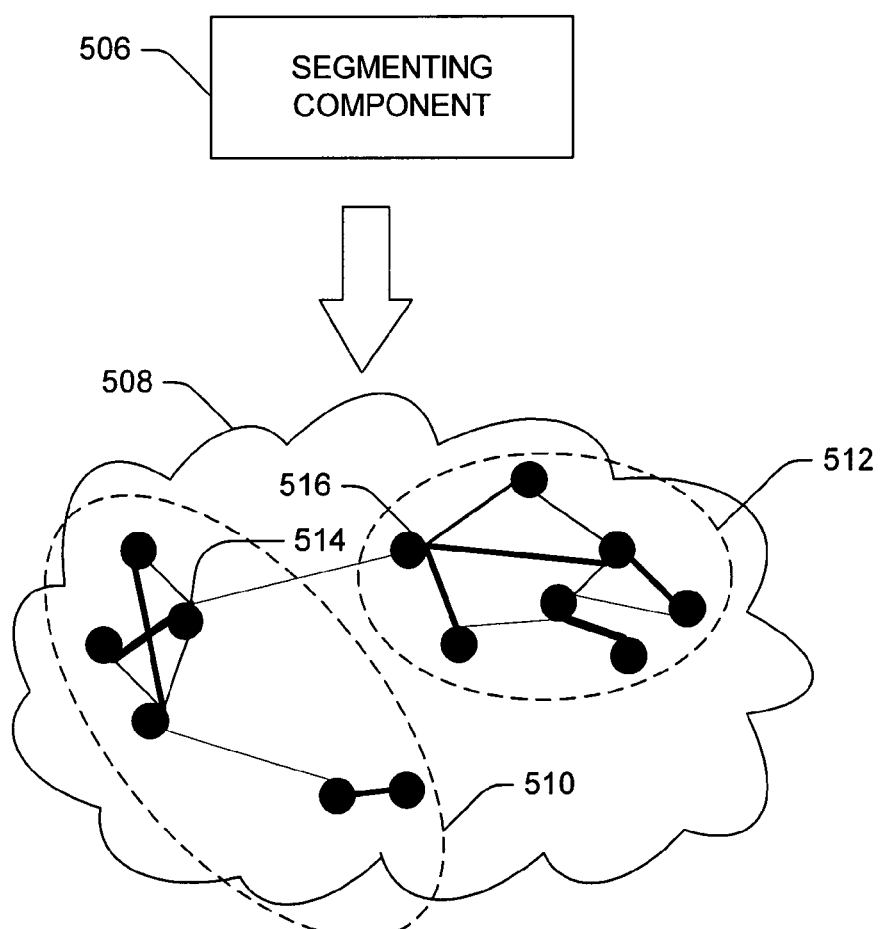
FIG. 5 is an exemplary weighted graph following segmentation in accordance with an aspect of the present invention.

Turning now to FIG. 5, an exemplary weighted cluster graph 508 is illustrated, wherein such graph has been segmented by a segmenting component 506 into clusters of related newsgroups. The weighted cluster graph 508 is divided into segments 510 and 512 upon determination by the segmenting component 506 that optimal segmentation occurs between vertices 514 and 516. Clustering facilitates providing for more granular and comprehensive understanding of relatedness between various newsgroups. For example, the above clustering illustrates that newsgroups residing in cluster 510 are not substantially related to newsgroups residing in cluster 512. Such understanding of the relatedness of the various newsgroups was not readily apparent prior to the segmentation.

Regarding segmentation of a weighted graph (for example, exemplary weighted cluster graph 508), such graphs can ideally be partitioned by segmenting between vertices to substantially minimize edges between clusters while concurrently creating clusters of desirable size. Defining different tradeoffs between these two objectives can result in different optimization problems. In accordance with one particular aspect of the present invention, clusters of substantially equal size (e.g., clusters comprising an approximately equal number of newsgroups) should result from partitioning a weighted graph. For sake of brevity, the following algorithm functions are defined to partition each segment into two new segments, $S$ and $\bar{S}$. It is to be understood, however, that such functions can be generalized to provide for segmentation resulting in creation of more than two segments.

Several traditional objective functions exist for determining where to segment between vertices in a weighted graph. A few examples are:

$$Rcut = \frac{cut}{|S|} + \frac{cut}{|\bar{S}|}; \quad Ncut = \frac{cut}{\alpha_S} + \frac{cut}{\alpha_{\bar{S}}}; \quad Mcut = \frac{cut}{W_S} + \frac{cut}{W_{\bar{S}}},$$

where $A=(\alpha_{ij})$ is the adjacency matrix, $cut=\Sigma_{i\in S, j\in \bar{S}}\alpha_{ij}$ is a total number of edges between $S$ and $\bar{S}$, $W_S=\Sigma_{i,j\in S}\alpha_{ij}$, and $\alpha_S=\Sigma_{i\in S}\Sigma_j \alpha_{ij}=\Sigma_{i\in S}d_i$, where $d_i=\Sigma_j\alpha_{ij}$ is the degree of i. However, it is NP-hard to determine the best segmentation according to any of the above objective functions (i.e., the computation time to solve the problem grows exponentially with size of the problem). As thousands of newsgroups currently exist, graphs of newsgroups can be quite large thus mandating the need for efficient algorithm(s) for determining where to segment a weighted graph.

Spectral analysis is a method mainly based on analysis of eigenvectors of a normalization of the adjacency matrix of the graph. Determining a Laplacian of a matrix is one common method for normalizing such matrix (e.g., the Laplacian $L=D-A$, where D is a diagonal matrix with $d_{ii}=\Sigma_j\alpha_{ij}$). A Fiedler vector v of adjacency matrix A is an eigenvector corresponding to a second smallest eigenvalue of the Laplacian L, which can be determined using equation $Lv=\lambda v$, where $\lambda$ is a second smallest eigenvalue of L. In practice, however, determining a vector corresponding to a second smallest solution of a generalized eigenvalue equation $Lv=\lambda Dv$ performs better than determining the Fiedler vector. This vector v is equal to the eigenvector corresponding to the second largest eigenvalue of $D^{-1/2}AD^{-1/2}$ multiplied to $D^{-1/2}$.

Prior to performing any segmentation, a segmentation value s is defined and vertices of a weighted graph are divided into at least two segments based upon whether or not values assigned to each segment by vector v are greater than the segmentation value s. There are several different manners to define the segmenting value s, including equating s to the median of values assigned to the vertices by v; defining s as being 0; assigning s as the value in the larges gap in the sorted list of Fiedler vector values; and/or utilizing one of the objective functions to find a value of s.

In order to partition a weighted graph into more than two clusters, the segmenting component 60 (shown in FIG. 1) segments S and $\overline{S}$ recursively. The segmenting component 60 can employ an algorithm facilitating segmentation between two or more vertices if the value of the proposed cut is above segmentation value s.

Figure 6:
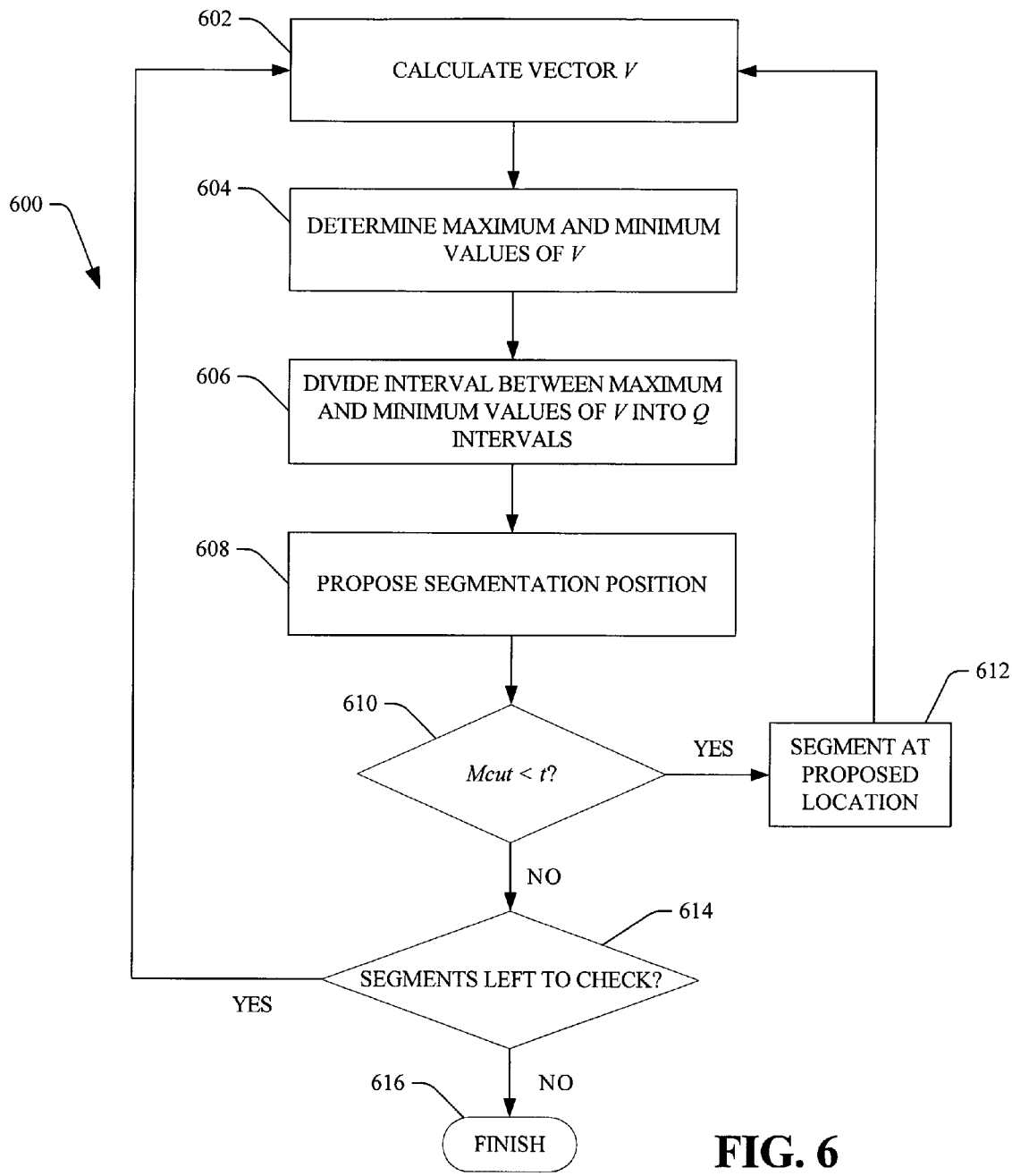
FIG. 6 is a flow diagram for determining the segmenting location within a weighted graph in accordance with an aspect of the present invention.

Now turning briefly to FIG. 6, a method 600 which can be utilized by the segmenting component 60 in accordance with one aspect of the present invention is illustrated. At 602, a vector v, which defines the value of a partition between two or more vertices, is obtained. Vector v can be obtained by computing an eigenvector corresponding to the second largest eigenvalue of matrix $D^{-1/2}AD^{-1/2}$. By multiplying the resulting eigenvector by diagonal matrix D, the solution v of equation $Lv=\lambda Dv$ can be obtained. At 604, maximum and minimum values of vector v, $v_{max}$ and $v_{min}$ respectively, are determined. At 606, interval $[v_{min}, v_{max}]$ is divided into Q smaller intervals. Q should be a value facilitating attainment of a desired accuracy and reliability in determining an appropriate segmentation of a weighted graph, while not being so large as to require unreasonable computation.

At 608, a segmentation position on the weighted graph is proposed. The minimum Mcut ratio of the Q intervals can be determined by calculating an Mcut ratio at endpoints of each of the Q intervals. After the minimum Mcut value is found from such Q intervals, then the Mcut is calculated at P values above and below the endpoint of the minimizing interval. P should be a value facilitating attainment of a desired accuracy and reliability in determining an appropriate segmentation of a weighted graph, while not being so large as to require unreasonable computation. Of these 2P eigenvector entries, the eigenvector entry where the Mcut ratio is lowest will be the proposed location of segmentation on the graph.

At 610, the Mcut ratio of the proposed segmenting position is compared to a pre-defined threshold t. If the Mcut ratio is less than t, at 612 the weighted graph is segmented at the proposed segmenting position, and acts 602-610 are recursively applied to both created segments. If the Mcut ratio is greater than threshold t, no segmentation occurs, and at 614 the algorithm determines whether any segments exist on which acts 602-610 have not been executed. If such acts 602-610 have not been executed on a segment, acts 602-610 are again applied to such segment. If all existing segments are of a desired size and/or quality, method 600 completes at 616.

The threshold t should be chosen to create final clusters of a desired size and/or quality, wherein quality is determined by some measure of relatedness within each segment (e.g., a sufficient degree of cross-posting exists between newsgroups within each cluster). In one particular aspect of the present invention, t can be defined as an increasing function of the number of nodes in a segment on which method 600 is currently being executed. For example, $$t = \frac{\sqrt{n}}{30} \text{ and } t = \frac{n}{300}$$

are two examples wherein a number of nodes in a segment can be utilized to define t. Alternatively, t can be defined as any number between 0 and 1, depending on a how many newsgroups in a final cluster are desirable. FIGS. 7A-C represent exemplary distribution of cluster sizes for different values of t. Turning first to FIG. 7A, a graphical depiction 730 of distribution of cluster sizes for $$t = \frac{\sqrt{n}}{30}$$

is displayed. FIG. 7B, illustrates a second graphical depiction 332 of cluster sizes for t=0.3. FIG. 7C illustrates a third graphical depiction 334 of cluster sizes for $$t = \frac{n}{300}.$$

Returning to FIG. 6, using a recursive spectral clustering technique such as that described in connection with method 600 provides for three distinct advantages over other spectral clustering methods, wherein such methods immediately separate a group of vertices into a predefined number of clusters. First, if a resulting cluster size is too large, clusters can be further partitioned without executing an algorithm at least a second time over an entire data set. Second, a cluster of insufficient size can be merged with other clusters without requiring an algorithm to be performed over an entire data set repeatedly. Finally, some measure of the quality of each cluster (e.g., a sufficient degree of cross-posting between newsgroups within each cluster) can be reviewed, and clusters can be partitioned or merged without requiring performance of an algorithm over a data set numerous times. In theory, if cluster A is segmented into clusters B and C, then the quality of clusters B and C should be greater than the quality of cluster A. However, because method 600 employs an approximation algorithm, cluster A can possibly possess greater quality than clusters B and C. The recursive spectral clustering method 600 can be utilized to output the quality of each cluster to data store 52 (FIG. 1), and such output data can later be employed to facilitate merging clusters B and C if their respective quality is less than original cluster A's quality.

Figure 8A:
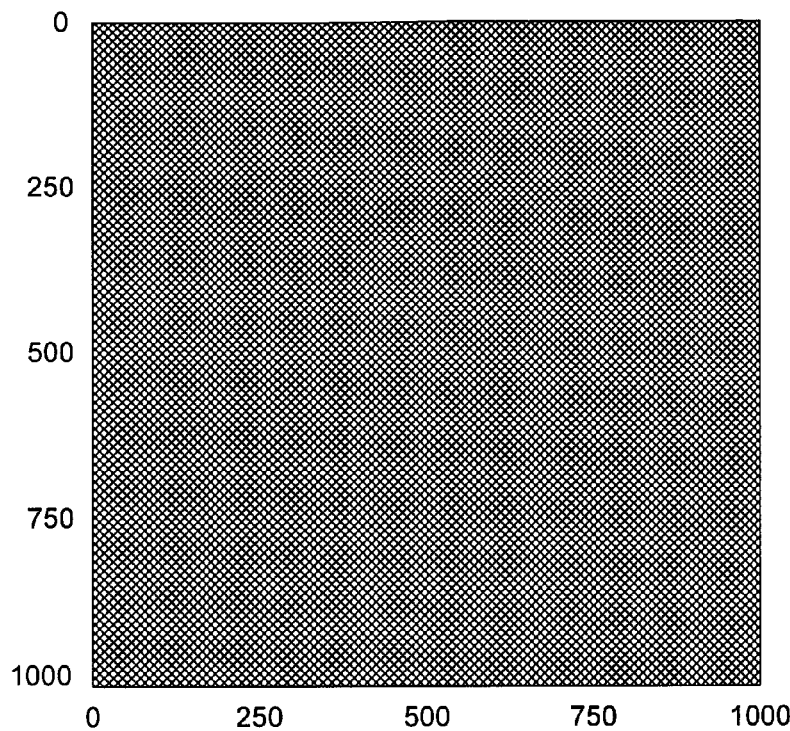
FIG. 8A is an illustration of an adjacency matrix prior to clustering newsgroups.
Figure 8B:
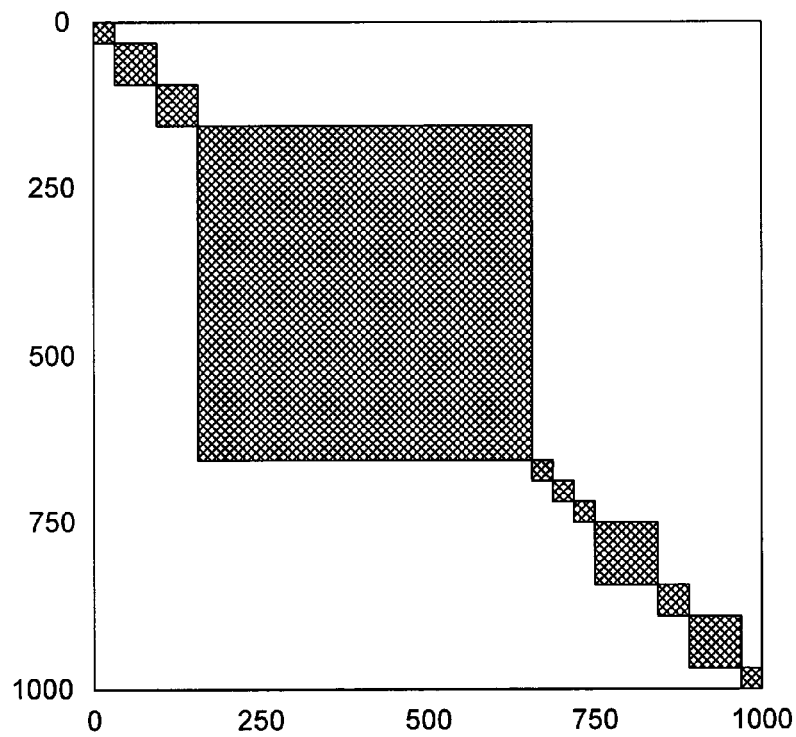
FIG. 8B is an illustration of an adjacency matrix after clustering newsgroups.

Turning briefly to FIGS. 8A and 8B, exemplary results of method 600 on a large number of newsgroups is displayed. Turning first to FIG. 8A, an exemplary adjacency matrix 840 depicting tens-of-thousands of newsgroups is illustrated. As is readily apparent from this figure, confusion regarding relatedness between newsgroups will likely result prior to clustering. Turning now to FIG. 8B, an adjacency matrix 850 depicts results of clustering thousands of newsgroups into several different clusters. The adjacency matrix 850 is re-arranged following clustering to associate newsgroups with a high-level of cross-posting amongst one another. One execution of method 600 (FIG. 6) resulted in approximately 76% of total cross-posts occurring between newsgroups residing in the same cluster. As displayed in FIG. 8B, newsgroups re-locate in adjacency matrix 850 to associate themselves with other newsgroups with which they are substantially related.

Figure 9:
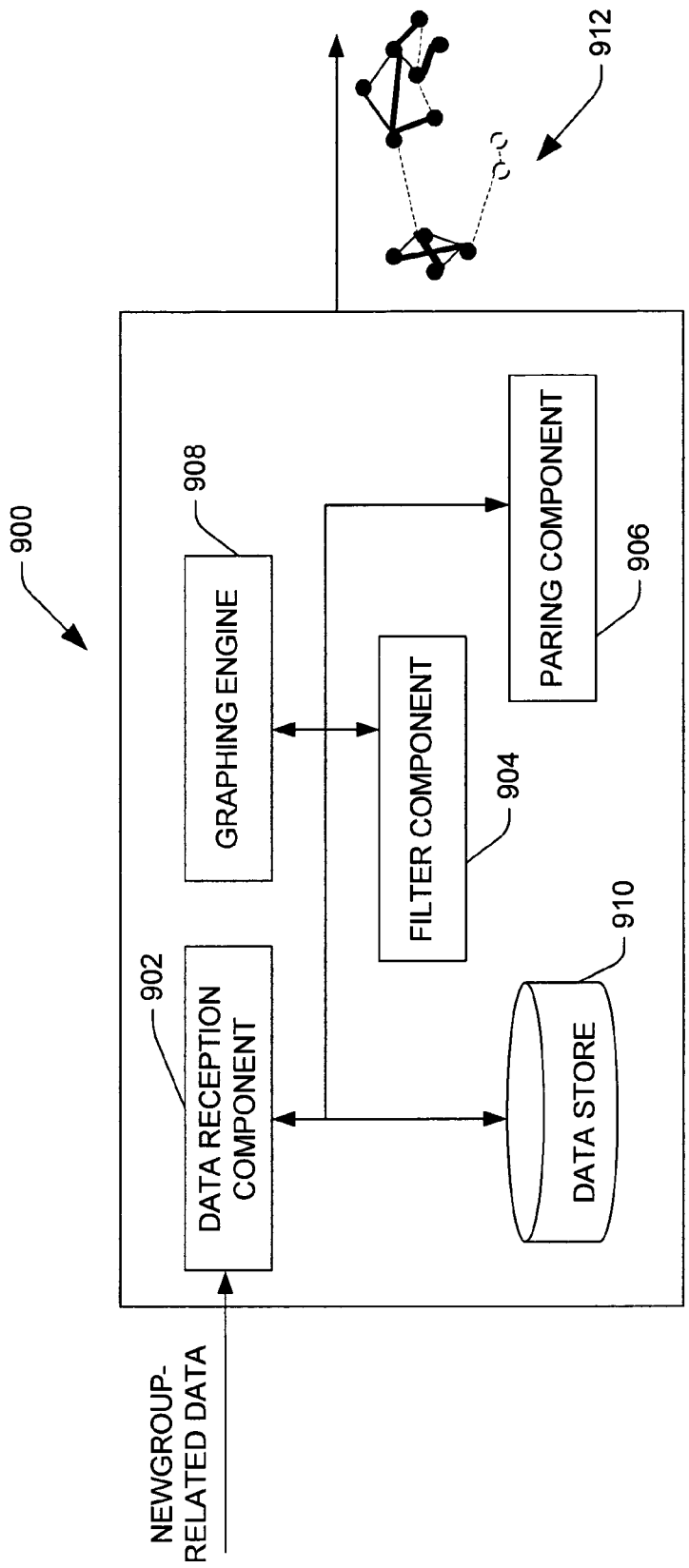
FIG. 9 is a block diagram of a cluster graphing system wherein data can be filtered and pared in accordance with an aspect of the present invention.
Figure 10:
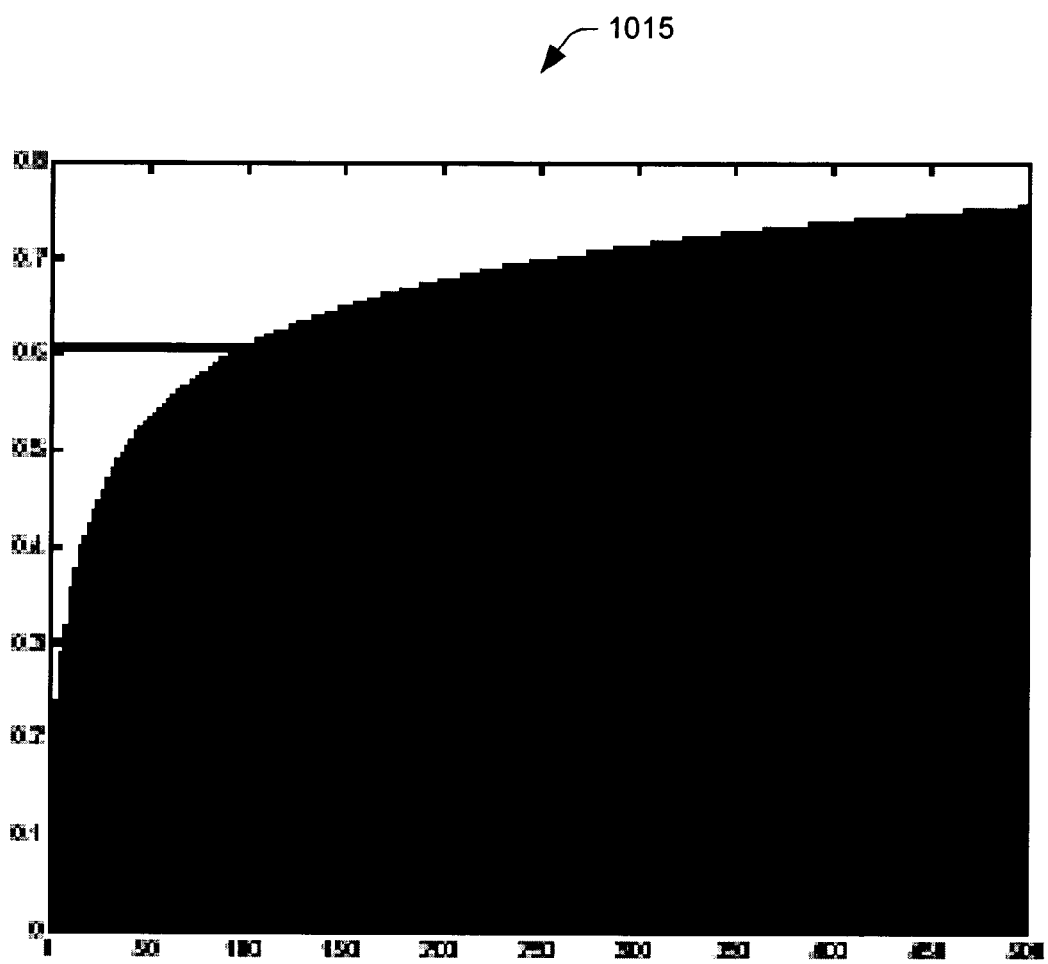
FIG. 10 is a graph of the fraction of newsgroups containing x number of posts over a given time.

Regarding FIG. 9, a cluster graphing system 900 in accordance with another aspect of the present invention is displayed. The system 900 comprises a data reception component 902, a filtering component 904, a paring component 906, a graphing engine 908, and a data store 910. Filtering component 904 is employed to facilitate reduction of computation required to create a weighted cluster graph 912. The filtering component 904 reduces size of a newsgroup data set by removing certain newsgroups that do not meet a predefined criteria prior to the graphing engine 908 constructing the weighted cluster graph 912. For example, a minimum threshold can be defined wherein newsgroups not containing a number of posts greater than such minimum threshold are effectively excluded from the data set utilized by the graphing engine 908 to generate the weighted cluster graph. Turning briefly to FIG. 10, an exemplary graph 1015 displaying a fraction of newsgroups with at most x postings over a given period of time as a function of x is illustrated. The filtering component 904 can be utilized to facilitate reduction in size of a data set by eliminating newsgroups not containing a threshold number of postings. For example, if 100 is selected as the threshold number of postings to a newsgroup over a given period of time, the filtering component 904 can be employed to eliminate approximately 62% of newsgroups contained in the data set contemplated by graph 1015.

Returning now to FIG. 9, the filtering component 904 can furthermore employ various inference schemes and/or techniques in connection with excluding undesirable newsgroups from a data set contemplated by graphing engine 908. For example, the filtering component 904 can employ explicitly trained as well as implicitly trained classifiers in connection with inferring desired data to be delivered to and/or relayed from the data reception component 902, the paring component 906, the graphing engine 908, and/or the data store 910. The system 900 can be implicitly trained by watching a user over time to learn which types of newsgroups the user likes to access and thus automatically filter undesirable newsgroups based upon the training. For instance, if a user frequently desires to access news and newsgroups regarding travel, and rarely desires access to news and newsgroups regarding sports, sports newsgroups can be filtered prior to being delivered to and/or relayed from the data reception component 902, the paring component 906, the graphing engine 908, and/or the data store 910. The filtering component 904 can employ a utility-based analysis wherein the cost of filtering desirable newsgroups can be factored against the benefits of filtering undesirable newsgroups in connection with a particular user and computing context/state.

To facilitate further reduction of size in a data set, the paring component 406 can eliminate cross-posts between newsgroups (and thus edges between vertices) when the number of cross-posts between two or more newsgroups is below a pre-defined threshold. Alternatively, the threshold can vary with the size of a data set contained in data reception component 902 by defining the threshold as an increasing function of number(s) of newsgroups contained in the data store 910. The paring component 906 can further be employed to eliminate newsgroups that do not contain a sufficient amount of cross-posting with other newsgroups. Thus, size of a cluster graph can be effectively reduced. Moreover, when the filter component 904 and/or the paring component 906 are used in conjunction with a segmenting component (not shown), the computational cost of segmenting a weighted graph into small clusters can be greatly reduced.

Figure 11:
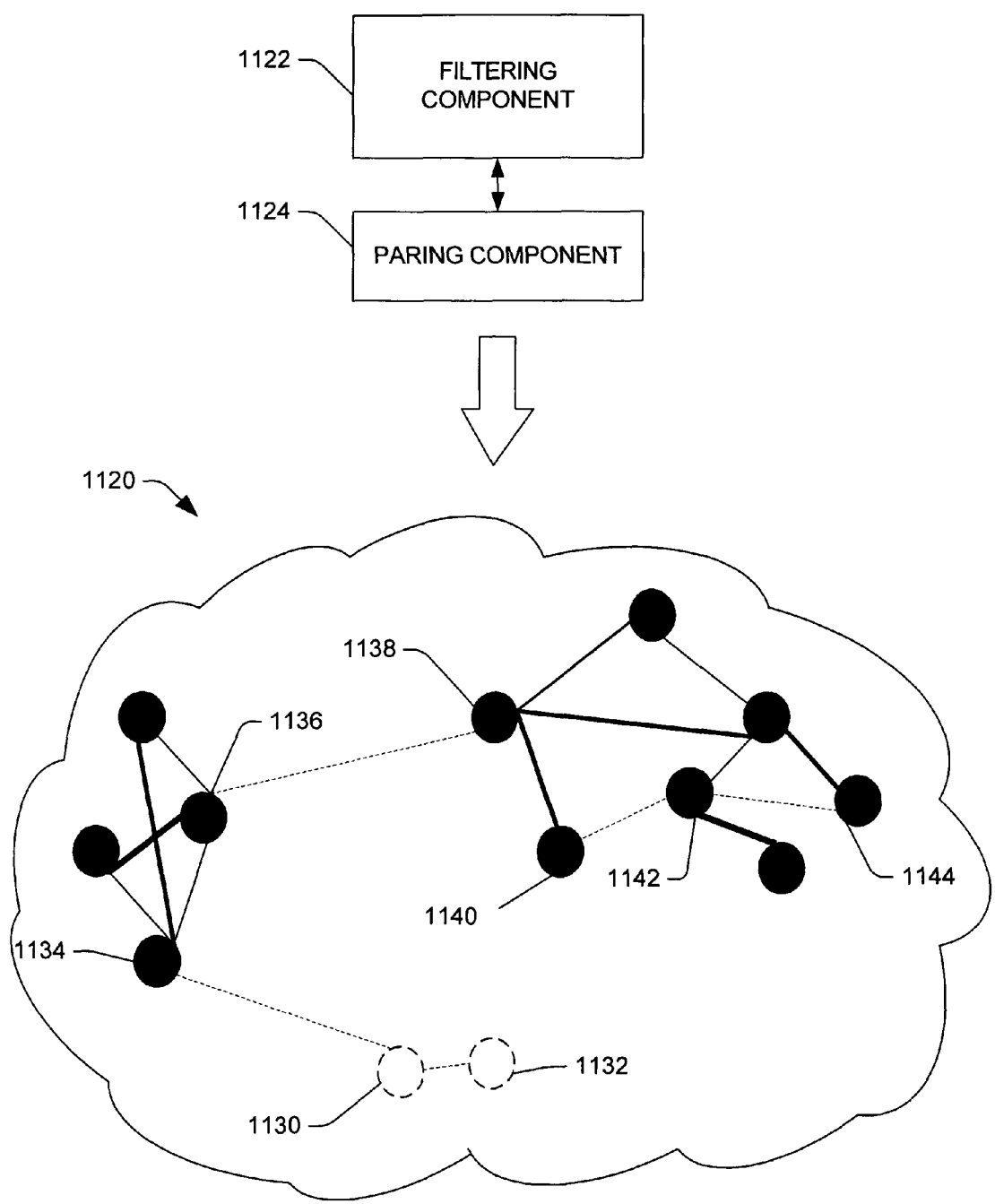
FIG. 11 is an exemplary weighted graph following filtering and paring of newsgroup data in accordance with an aspect of the present invention.

Turning now to FIG. 11, an exemplary graph 1120 created through use of a filtering component 1122 and paring component 1124 are displayed. The filtering component 1122 effectively eliminates from a data set newsgroups with insufficient postings or irrelevant newsgroups, and the paring component 1124 eliminates from a data set cross-posts between newsgroups, wherein an insufficient number of cross-posts exist between two or more newsgroups. Furthermore, the paring component 1124 excludes newsgroups not containing a substantial number of cross-posts from the data set. Vertices (newsgroups) and edges (cross-posts) removed from the set of data prior to construction of the graph 1120 are illustrated as dashed edges and vertices. Vertices 1130 and 1132 are shown as being excluded from a data set by the filtering component 1122. Thereby the edges between the vertices 1130 and 1132, and between vertices 1130 and 1134 respectively, are removed from the data set.

The paring component 1124 removed from the data set edges between vertices 1136 and 1138, 1140 and 1142, and 1142 and 1144 respectively. An insubstantial number of cross-posts between a plurality of newsgroups is indicative of a minimal degree of relatedness between such newsgroups, which in turn insinuates that elimination of edges representing such cross-posts is desirable.

Figure 12:
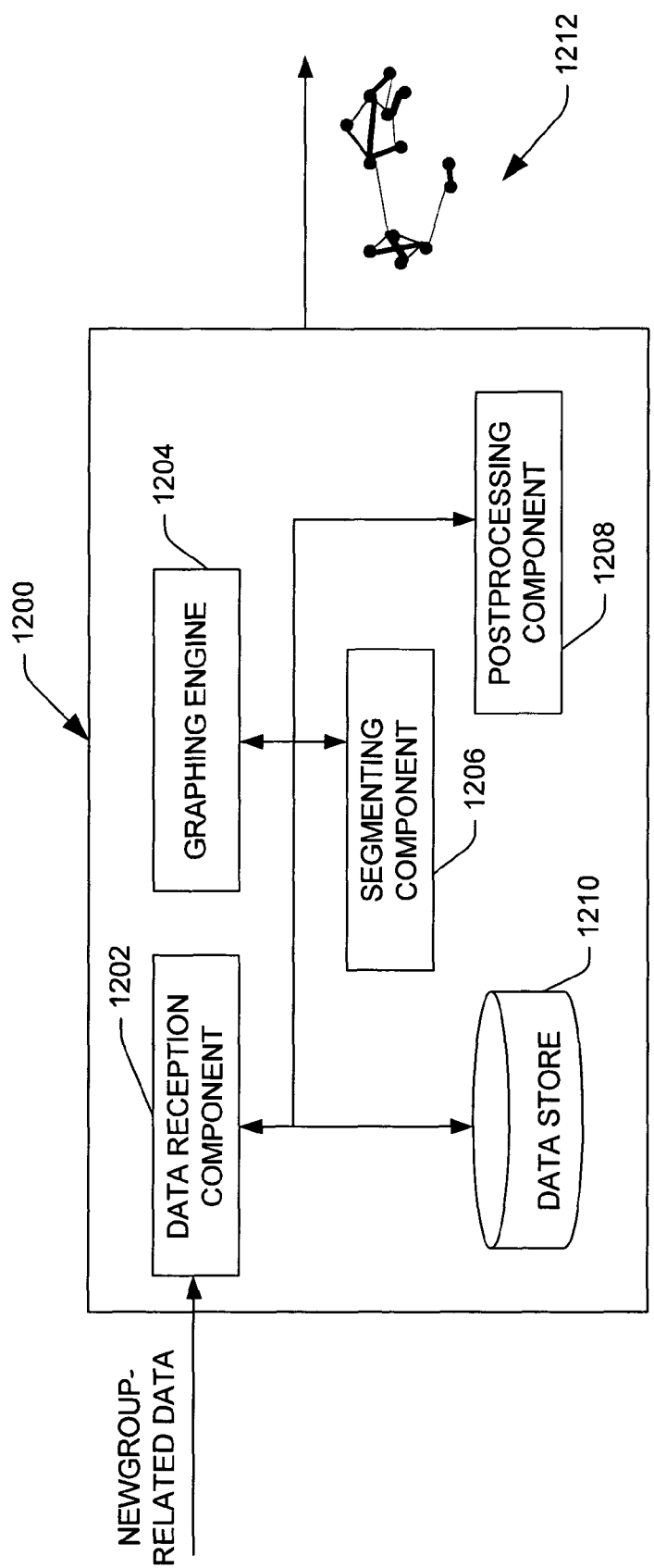
FIG. 12 is a block diagram of a cluster graphing system wherein segmented component can be merged in accordance with an aspect of the present invention.

Turning now to FIG. 12, a cluster graphing system 1200 is illustrated comprising a data reception component 1202, a graphing engine 1204, a segmenting component 1206, a post-processing component 1208, and a data store 1210. The post-processing component 1208 facilitates merging of clusters segmented by the segmenting component 1206. The data reception component 1202 receives data relating to newsgroups, and transfers such data to the data store 1210. At least a subset of data from the data reception component 1202 and/or data store 1210 is relayed to the graphing engine 1204, which facilitates creation of a weighted graph 1212. The segmenting component is employed to segment the weighted graph 1212 into clusters of highly related newsgroups. The post-processing component 1208 facilitates merging of two or more clusters if upon review such two or more clusters are substantially related. Defining a threshold value to determine whether or not two or more clusters are substantially related, wherein weights of edges between clusters is greater than such threshold, is one method that can be employed by the post processing component 1208 for merging two or more clusters. Merging a first cluster into a second cluster if summation of weights of edges between such two clusters is more than half of a summation of weights of edges adjacent to such first cluster is one manner of determining an appropriate instance for merging two clusters. The previous method, written mathematically, provides for merging of two clusters A and B if $$\alpha(A, B) \geq \frac{1}{2}\alpha_A,$$

where $\alpha(A,B)=\Sigma_{i\in A}\Sigma_{j\in B}\alpha_{ij}$ is the cut between A and B, and $\alpha_A=\Sigma_{i\in A}\Sigma_j \alpha_{ij}$ is the total number of edges beginning in A (regardless of whether they end inside or outside of A). The post-processing component 1208, however, is capable of merging two or more segmented clusters using any algorithm or threshold of relatedness.

Figure 13:
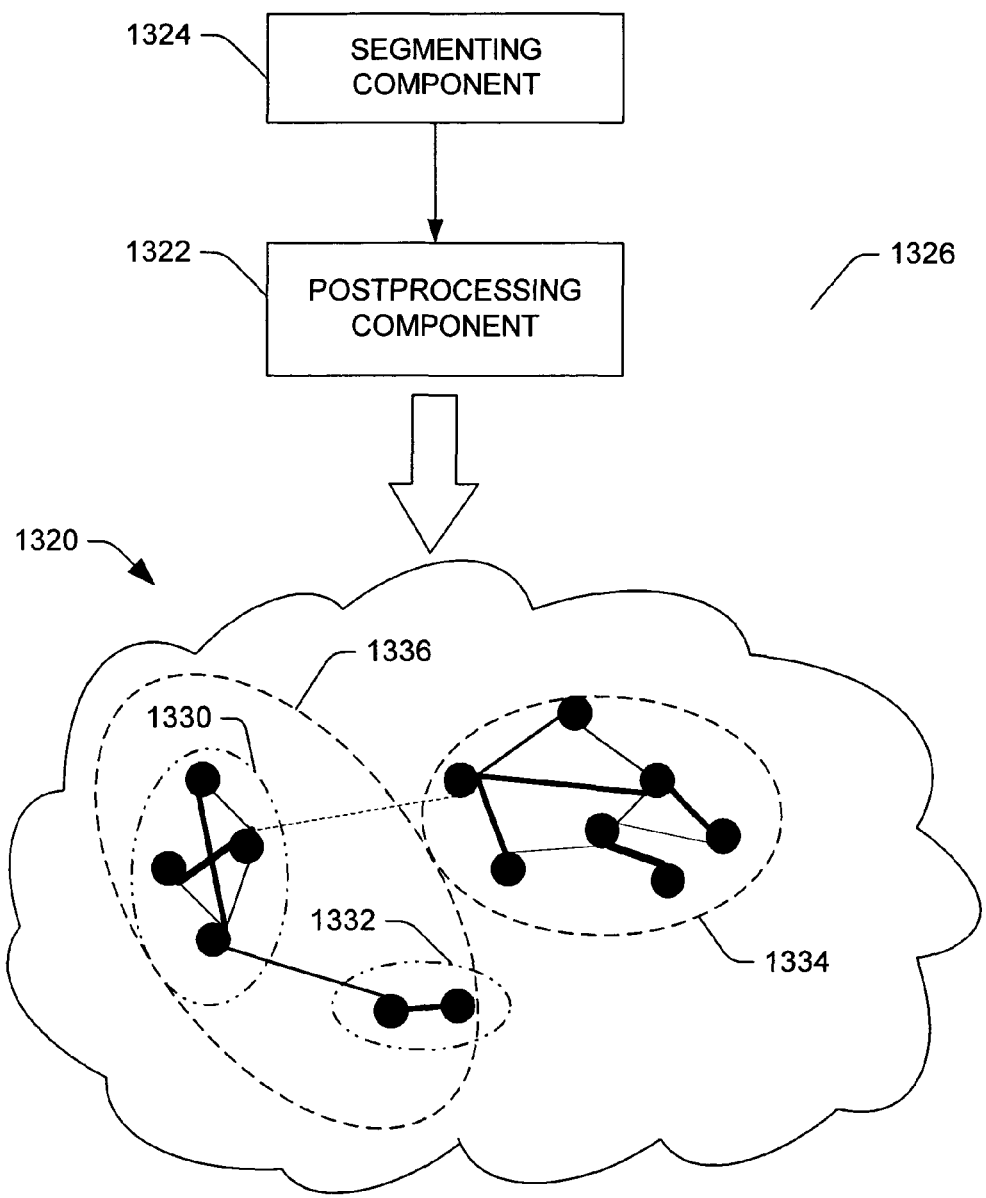
FIG. 13 is an exemplary weighted graph following merging in accordance with an aspect of the present invention.

Turning now to FIG. 13, an exemplary weighted cluster graph 1320 is displayed which illustrates a cluster graph 1320 before and after determination by a post-processing component 1322 of which, if any, clusters should be merged into a single cluster. A segmenting component 1324 employed to partition a weighted graph previously segmented such graph into clusters 1330, 1332, and 1334 based upon a recursive segmentation algorithm. The post-processing component 1322 can be employed to review clusters 1330, 1332, and 1334 and determine that clusters 1330 and 1332 are sufficiently related thereby to make merging clusters 1330 and 1332 into a single cluster 1336 desirable. Thus, the final weighted cluster graph 1320 contains only two clusters, 1334 and 1336 respectively.

Figure 14A:
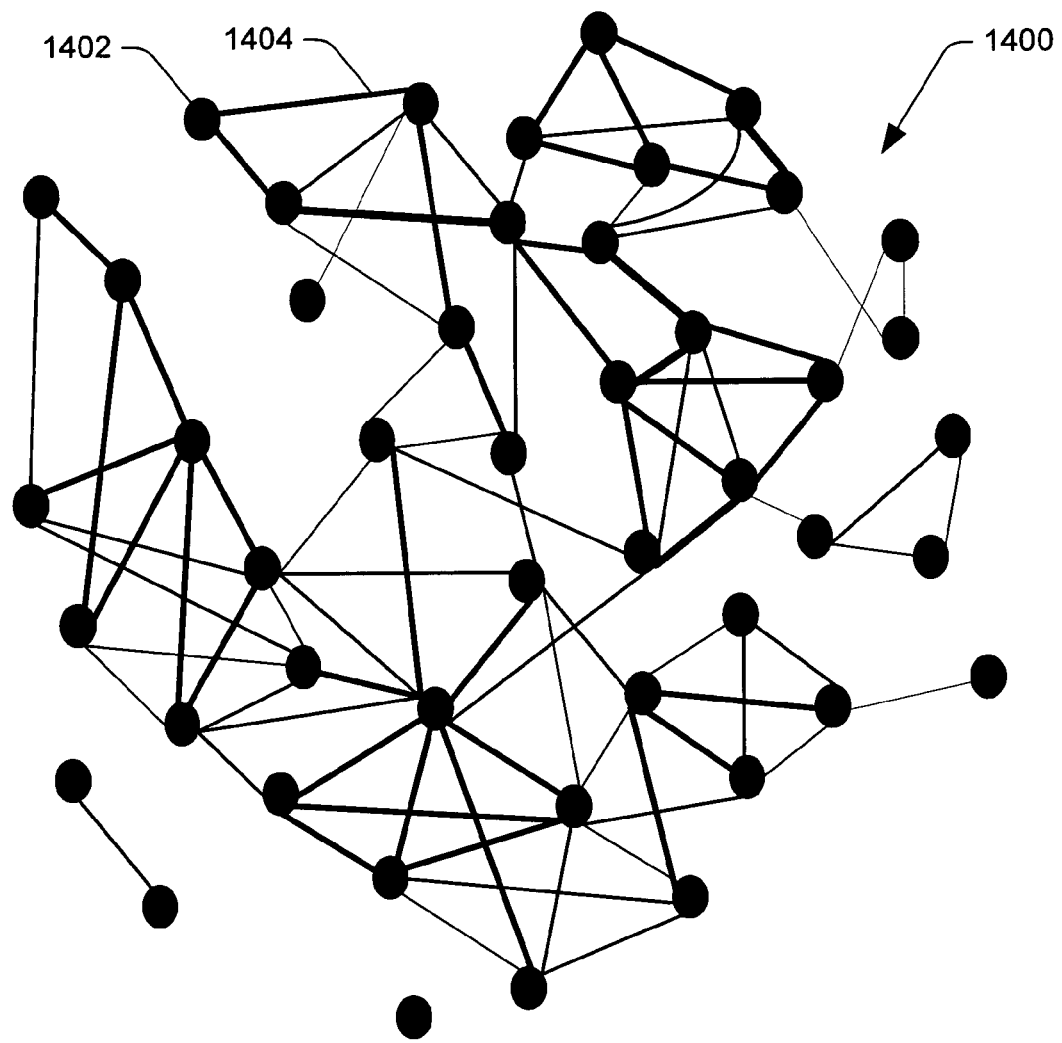
FIG. 14A is an exemplary weighted graph in accordance with an aspect of the present invention.
Figure 14B:
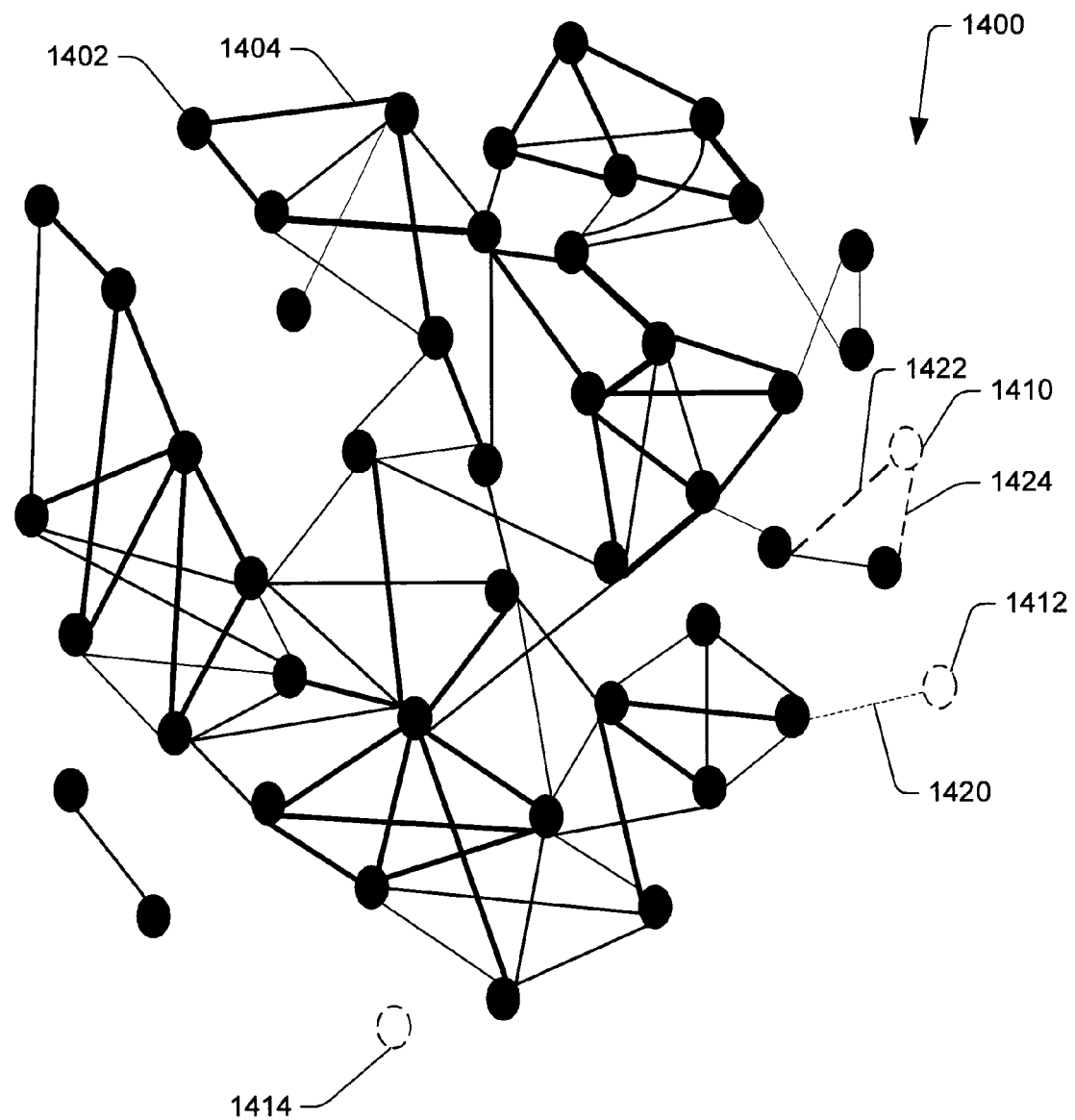
FIG. 14B is an exemplary weighted graph wherein several vertices have been filtered in accordance with an aspect of the present invention.

Turning now to FIGS. 14A-14D, a detailed weighted graph 1400 is illustrated as data is removed from a data set to decrease size of the resulting weighted graph. Turning first to FIG. 14A, a weighted graph 1400 of newsgroups and cross-posts is illustrated, wherein newsgroups are represented by vertices 1402 and cross-posts are represented by edges 1404. Weights of the edges 1404 between the vertices 1402 are indicative of the number of cross-posts between newsgroups. While not utilized in these figures, size of the vertices 1402 may indicate the number of postings within a newsgroup (e.g., as number of postings within newsgroups increase, size of vertices representing such newsgroups increases). Regarding FIG. 14B, the exemplary weighted graph 1400 is displayed wherein a subset of data defining weighted graph 1400 has been excluded. Specifically, vertices 1410, 1412, and 1414 have been removed from the weighted graph 1400 as newsgroups represented by vertices 1410, 1412, and 1414 do not contain a sufficient number of postings, or alternatively, upon artificial intelligence means determining from user state and context that topics discussed in such newsgroups were undesirable. As vertices 1410, 1412, and 1414 were excluded from the data set, edges 1420, 1422 and 1424 corresponding to filtered vertices 1410, 1412, and 1414 will also not be excluded from weighted graph 1400.

Figure 14C:
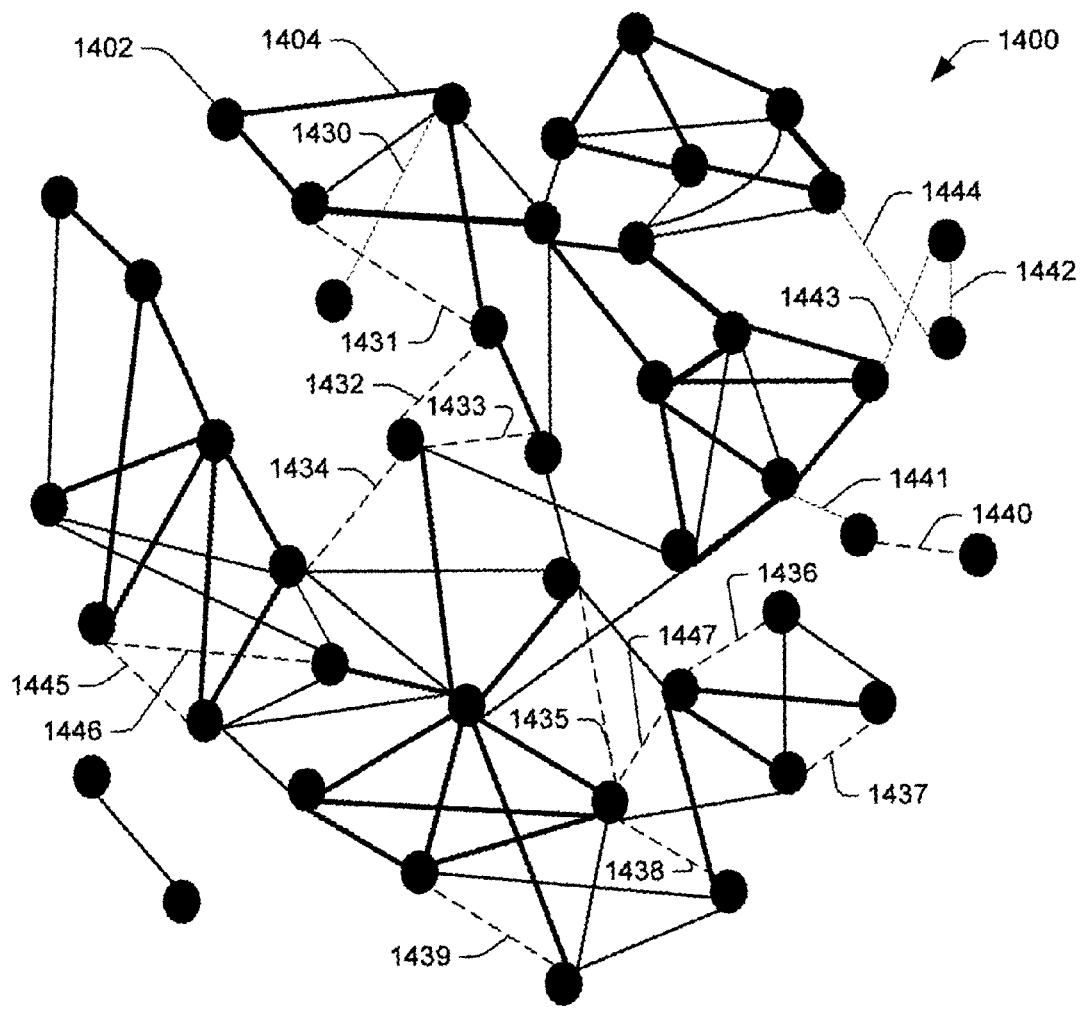
FIG. 14C is an exemplary weighted graph wherein several edges have been pared in accordance with one aspect of the present invention.

Now turning to FIG. 14C, the exemplary weighted graph 1400 is displayed after a plurality of edges 1404 between vertices 1402 have been removed from exemplary weighted graph 1400. Edges 1404 are removed in instances that insufficient amount of cross-postings exists between two or more newsgroups. Few cross-posts between two newsgroups over a sufficient time period is indicative that such two newsgroups are not related. Therefore to facilitate reduction of graph size and computation cost for segmentation of the weighted graph 1400, edges 1430-1447 respectively have been eliminated from the weighted graph 1400.

Figure 14D:
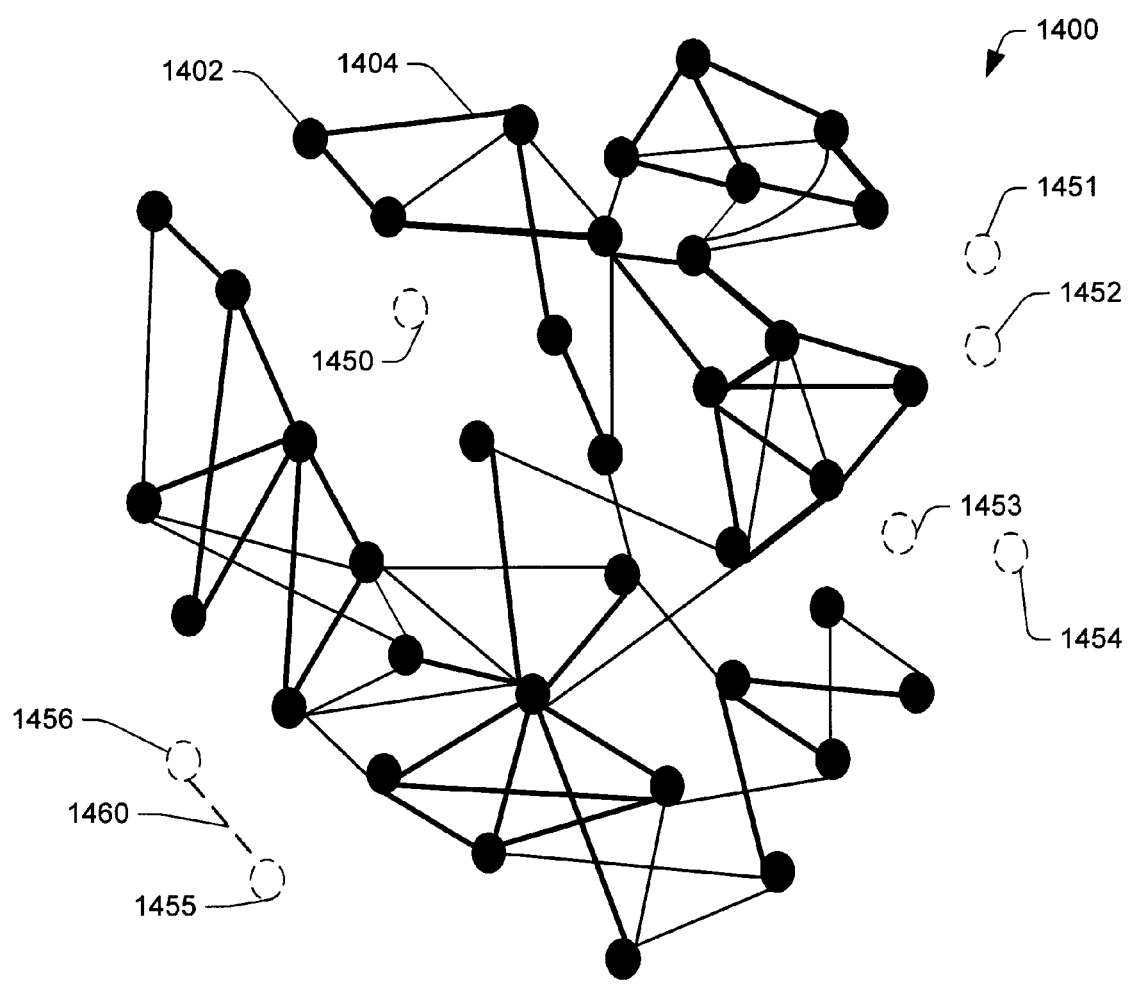
FIG. 14D is an exemplary weighted graph wherein vertices and edges of the graph are removed in accordance with an aspect of the present invention.

Regarding FIG. 14D, the exemplary weighted graph 1400 is shown after all vertices not connected by a sufficient number of edges are removed from exemplary weighted graph 1400. Removal of isolated newsgroups is desirable as isolated newsgroups are indicative of inactive newsgroups and/or newsgroups discussing extremely specific topics. As shown in 14D, vertices 1450-1456 have been excluded from exemplary weighted graph 1400. Furthermore, edge 1460 located between vertices 1455 and 1456 has been removed from weighted graph 1400. It should be noted that while pre-processing the data (e.g., filtering newsgroups, paring edges, and removing isolated newsgroups) will reduce size of a weighted graph and reduce computation time required for segmentation of such graph, processing a data set prior to segmentation can bias remaining data to be segmented. Therefore any pre-processing should be done with great care.

Figure 15A:
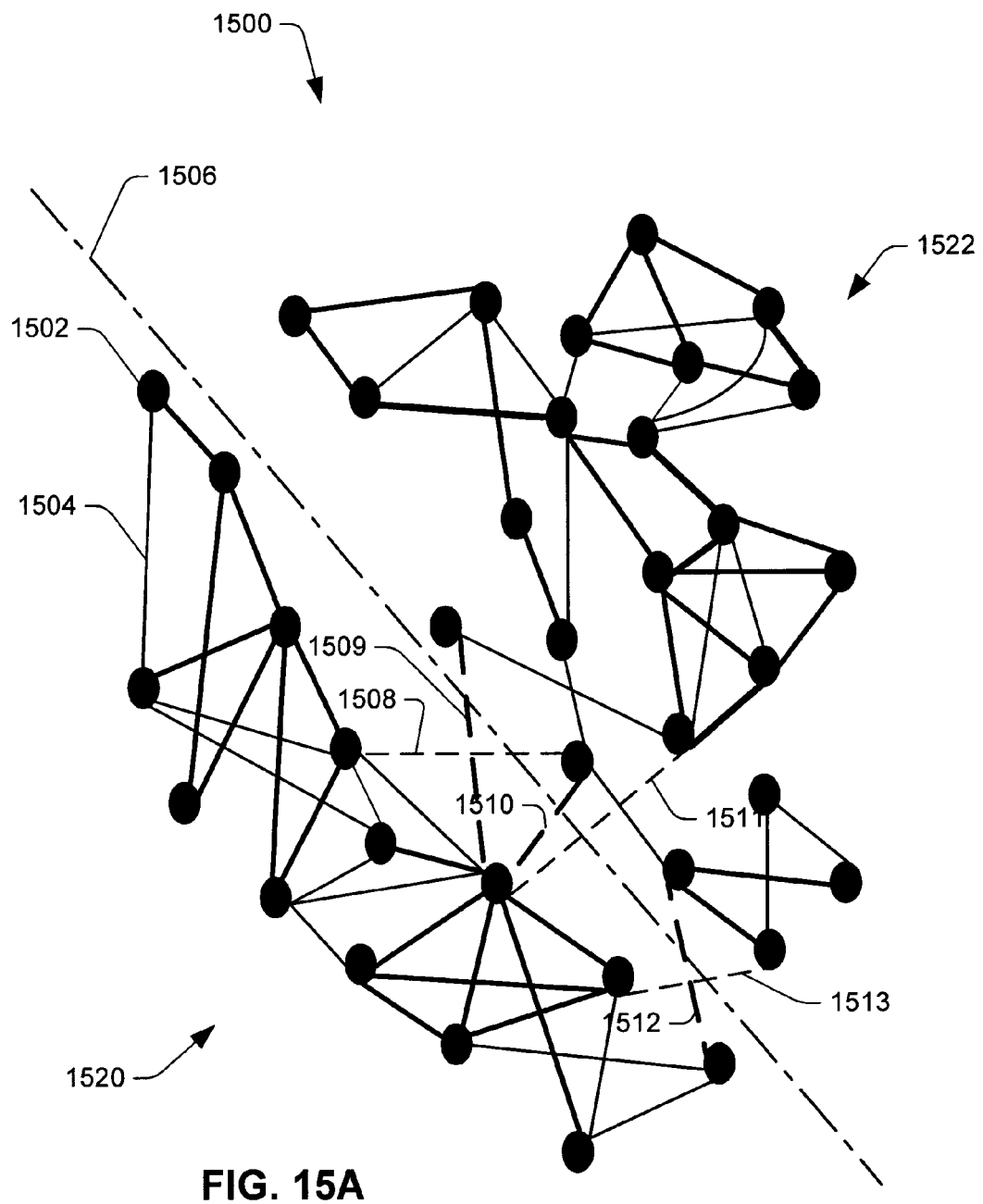
FIG. 15A is an exemplary weighted graph wherein a segmentation algorithm has determined a partition position in accordance with an aspect of the present invention.

Turning now to FIG. 15A, an exemplary weighted graph 1500 is illustrated. The weighted graph 1500 comprises several vertices 1502, which represent newsgroups, interconnected with one another by weighted edges 1504, which represent cross-posts. Weights of edges 1504 are indicative of the number of cross-posts between newsgroups 1502. A segmentation algorithm is utilized to facilitate determination of where partitioning the weighted graph 1500 minimizes severance of the weighted edges 1504 between vertices 1502. As shown in FIG. 15A, a segmenting line 1506 is utilized to depict a segmentation position where optimal segmentation will occur. In order to segment the weighted graph 1500, edges 1508-1513 must be cut, creating two new segments on each side of segmentation line 1506, segments 1520 and 1522 respectively.

Figure 15B:
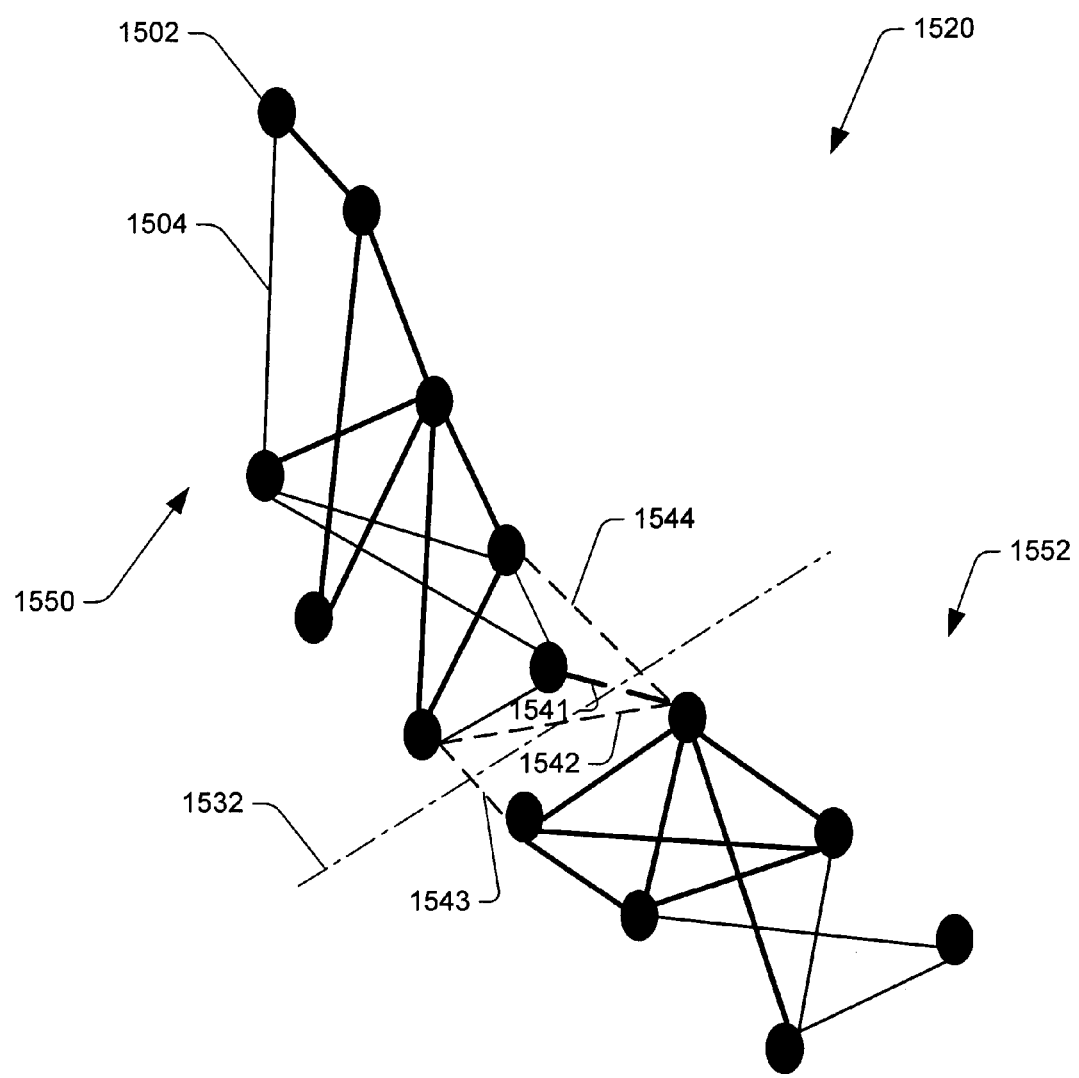
FIG. 15B is an exemplary weighted graph wherein a segmentation algorithm determines another partition position in accordance with an aspect of the present invention.

Turning to FIG. 15B, a segmenting algorithm is run recursively to further partition segment 1520 into smaller segments or clusters. In the exemplary segment 1520, a segmenting algorithm has determined that an appropriate position to partition segment 1520 occurs along segmenting line 1532. Thus, edges 1541-1544 are cut, and segments 1550 and 1552 are created. The algorithm can be run recursively until a desirable final cluster size is attained. For example, a segment containing one thousand vertices would be too large, as a user would not be able to quickly decipher which newsgroups of the thousand are on-point. Furthermore, a segment containing two vertices could be too small, as extremely related newsgroups would be separated into different clusters.

Figure 16A:
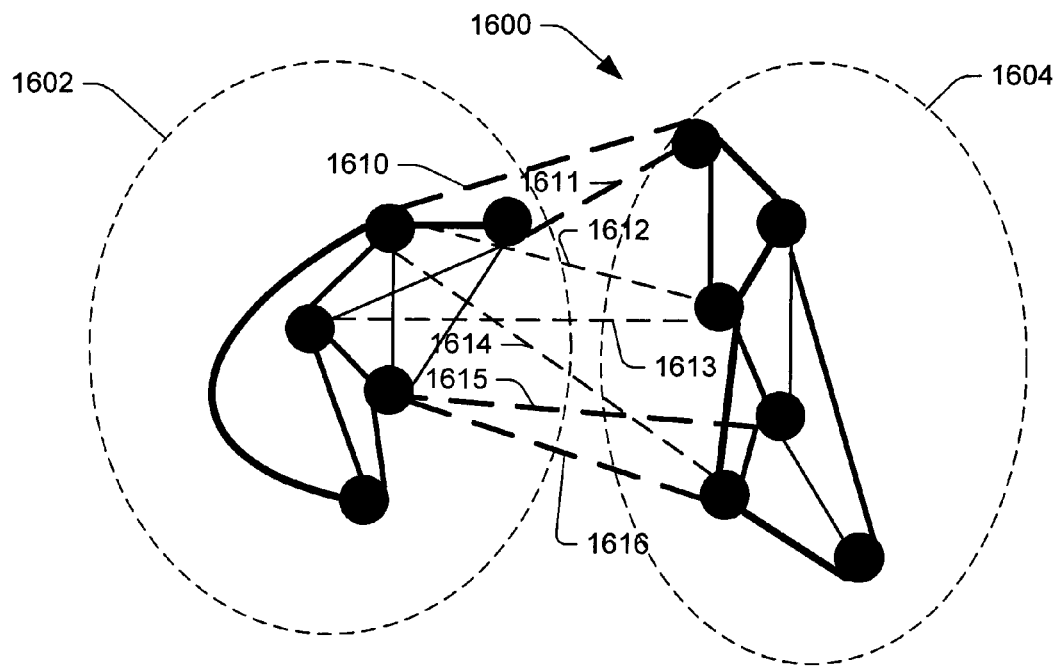
FIG. 16A is an exemplary weighted graph wherein two segments are created in accordance with an aspect of the present invention.
Figure 16B:
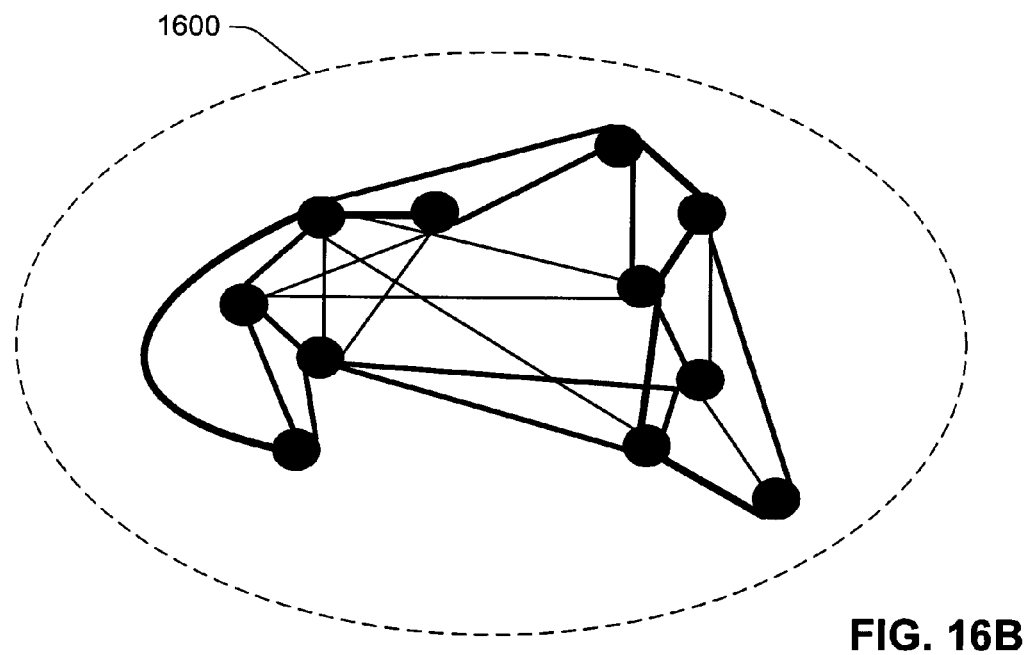
FIG. 16B is an exemplary weighted graph wherein the two segments are merged into one segment in accordance with an aspect of the present invention.

Regarding FIGS. 16A-16B, an exemplary weighted graph 1600 is displayed. Turning specifically to FIG. 16A, the weighted graph 1600 has been previously partitioned into segments 1602 and 1604 by a segmenting algorithm. However, as can be determined by the number and weights of edges 1610-1616 wherein severance was required by a segmenting algorithm, segments 1602 and 1604 are substantially related. Turning now to FIG. 16B, a post-processing algorithm merges segments 1602 and 1604 back into a single segment 1600. A post-processing algorithm reviews two or more segments to determine whether they are substantially related. If such two segments are substantially related, a post-processing algorithm facilitates merging of segments 1602 and 1604 (as shown in FIG. 16A) into a single segment 1600 as illustrated by the exemplary merger of FIG. 16B.

Figure 17:
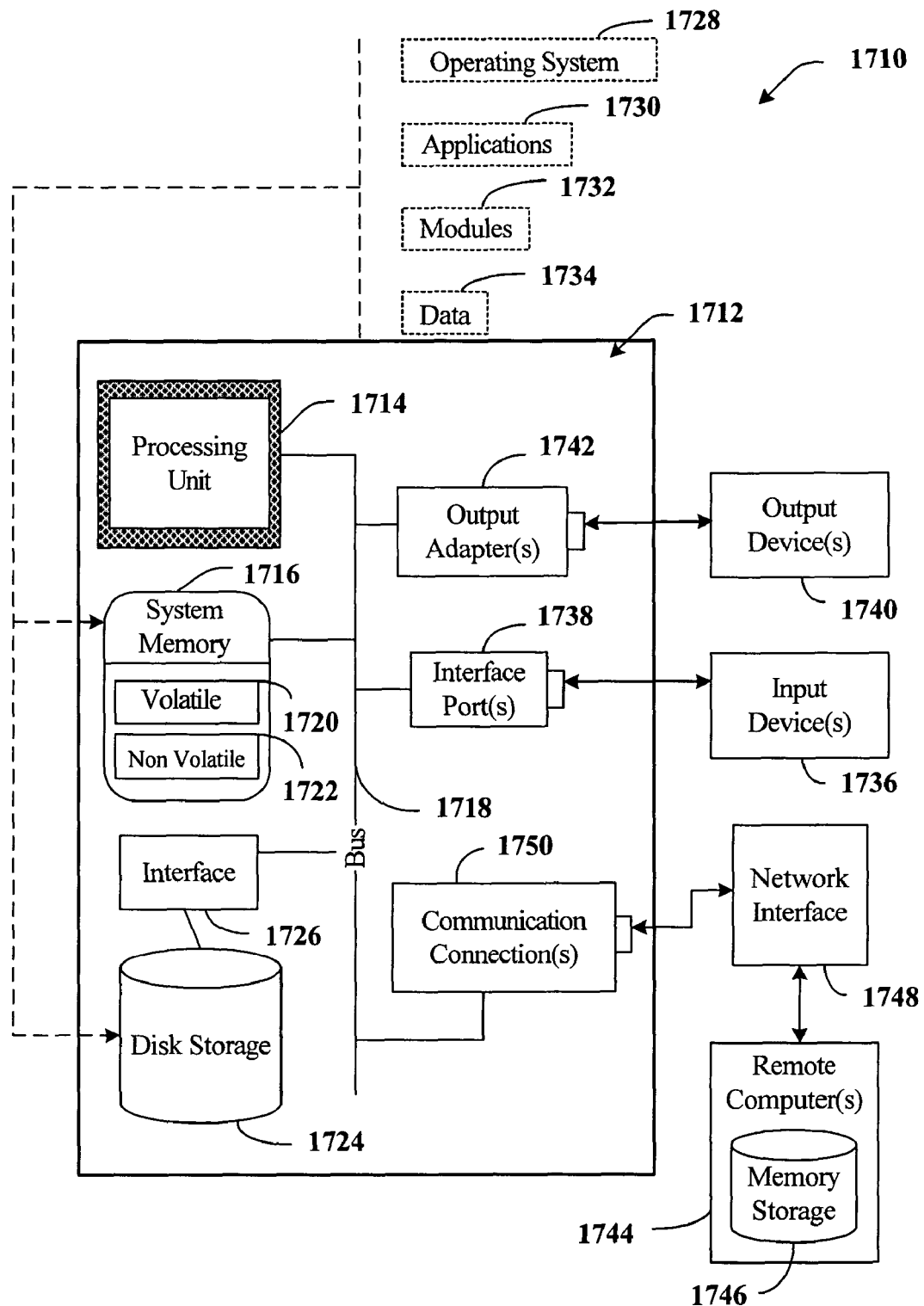
FIG. 17 illustrates an example operating environment in which the present invention may function.

In order to provide additional context for various aspects of the present invention, FIG. 17 and the following discussion are intended to provide a brief, general description of a suitable operating environment 1710 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 1710 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 17, an exemplary environment 1710 for implementing various aspects of the invention includes a computer 1712. The computer 1712 includes a processing unit 1714, a system memory 1716, and a system bus 1718. The system bus 1718 couples system components including, but not limited to, the system memory 1716 to the processing unit 1714. The processing unit 1714 can be any of various available processors. Dual microprocessors and other multiprocessor architectures also can be employed as the processing unit 1714.

The system bus 1718 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1716 includes volatile memory 1720 and nonvolatile memory 1722. The basic input/output system (BIOS), containing the basic routines to transfer information between elements within the computer 1712, such as during start-up, is stored in nonvolatile memory 1722. By way of illustration, and not limitation, nonvolatile memory 1722 can include read only memory (ROM), programmable ROM (PROM), electrically programmable ROM (EPROM), electrically erasable ROM (EEPROM), or flash memory. Volatile memory 1720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1712 also includes removable/nonremovable, volatile/nonvolatile computer storage media. FIG. 17 illustrates, for example a disk storage 1724. Disk storage 1724 includes, but is not limited to, devices like a magnetic disk drive, floppy disk drive, tape drive, Jaz drive, Zip drive, LS-100 drive, flash memory card, or memory stick. In addition, disk storage 1724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1724 to the system bus 1718, a removable or non-removable interface is typically used such as interface 1726.

It is to be appreciated that FIG. 17 describes software that acts as an intermediary between users and the basic computer resources described in suitable operating environment 1710. Such software includes an operating system 1728. Operating system 1728, which can be stored on disk storage 1724, acts to control and allocate resources of the computer system 1712. System applications 1730 take advantage of the management of resources by operating system 1728 through program modules 1732 and program data 1734 stored either in system memory 1716 or on disk storage 1724. It is to be appreciated that the present invention can be implemented with various operating systems or combinations of operating systems.

A user enters commands or information into the computer 1712 through input device(s) 1736. Input devices 1736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1714 through the system bus 1718 via interface port(s) 1738. Interface port(s) 1738 include, for example, a serial port, a parallel port, a game port, and a universal serial bus (USB). Output device(s) 1740 use some of the same type of ports as input device(s) 1736. Thus, for example, a USB port may be used to provide input to computer 1712, and to output information from computer 1712 to an output device 1740. Output adapter 1742 is provided to illustrate that there are some output devices 1740 like monitors, speakers, and printers among other output devices 1740 that require special adapters. The output adapters 1742 include, by way of illustration and not limitation, video and sound cards that provide a means of connection between the output device 1740 and the system bus 1718. It should be noted that other devices and/or systems of devices provide both input and output capabilities such as remote computer(s) 1744.

Computer 1712 can operate in a networked environment using logical connections to one or more remote computers, such as remote computer(s) 1744. The remote computer(s) 1744 can be a personal computer, a server, a router, a network PC, a workstation, a microprocessor based appliance, a peer device or other common network node and the like, and typically includes many or all of the elements described relative to computer 1712. For purposes of brevity, only a memory storage device 1746 is illustrated with remote computer(s) 1744. Remote computer(s) 1744 is logically connected to computer 1712 through a network interface 1748 and then physically connected via communication connection 1750. Network interface 1748 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1750 refers to the hardware/software employed to connect the network interface 1748 to the bus 1718. While communication connection 1550 is shown for illustrative clarity inside computer 1712, it can also be external to computer 1712. The hardware/software necessary for connection to the network interface 1748 includes, for exemplary purposes only, internal and external technologies such as, modems including regular telephone grade modems, cable modems and DSL modems, ISDN adapters, and Ethernet cards. What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system that facilitates analyzing newsgroup similarity, comprising:
   one or more hardware processors;
   memory coupled to the one or more hardware processors;
   a data reception component, stored in the memory and executed by the one or more processors, that receives data relating to a plurality of newsgroups and cross-postings between the plurality of newsgroups;
   a graphing engine, stored in the memory and executed by the one or more processors, that constructs a weighted graph with a subset of the newsgroups represented as vertices of the graph and cross-postings between two newsgroups of the subset of newsgroups represented as edges between vertices corresponding to the two newsgroups;
   a filtering component, stored in the memory and executed by the one or more processors, that excludes particular newsgroups from being represented in the weighted graph so as to facilitate reducing a size of the weighted graph;

a paring component, stored in the memory and executed by the one or more processors, that removes edges of the graph with a weight less than a threshold weight so as to facilitate reducing the size of the graph;

a segmenting component, stored in the memory and executed by the one or more processors, that segments the weighted graph; and a post-processing component, stored in the memory and executed by the one or more processors, that merges a first cluster of vertices and edges of the weighted graph into a second cluster of vertices and edges of the weighted graph if a sum of weights between the clusters is greater than a threshold.

2. The system of claim 1, further comprising a data store for storing:
newsgroup data received by the data reception component;
algorithms utilized for segmenting the weighted graph;
the weighted graph generated by the graphing engine; and
a graph generated by segmentation of the weighted graph via the segmenting component.

3. The system of claim 1, wherein the post-processing component outputs a modified weighted graph.

4. The system of claim 1, wherein the vertices of the weighted graph are weighted based at least in part on a number of postings to the corresponding newsgroups and the edges of the weighted graph are weighted based at least in part on a number of cross-postings between the two corresponding newsgroups.

5. The system of claim 1, further comprising a search engine configured to use the weighted graph when executing a newsgroup search and providing results from the newsgroups search.

6. The system of claim 1, further comprising an e-mail program configured to generate a suggestion that a post be cross-posted to other newsgroups, the other newsgroups identified at least in part by the weighted graph.

7. The system of claim 1, wherein the segmenting component segments the weighted graph via spectral clustering.

8. A computer-implemented method for creating a cluster graph comprising the following computer executable steps:
receiving data relating to a plurality of newsgroups and cross-postings between the plurality of newsgroups;
constructing, by a hardware processor, a weighted graph with a subset of the newsgroups represented as vertices of the graph and cross-postings between two newsgroups of the subset of newsgroups represented as edges between vertices corresponding to the two newsgroups;
excluding particular newsgroups from being represented in the weighted graph so as to facilitate reducing a size of the weighted graph;
removing edges of the graph with a weight less than a threshold weight so as to facilitate reducing the size of the graph;
segmenting the weighted graph; and
merging a first cluster of vertices and edges of the weighted graph into a second cluster of vertices and edges of the weighted graph if a sum of weights between the clusters is greater than a threshold.

9. The method of claim 8, further comprising:
storing newsgroup data received by the data reception component, algorithms utilized for segmenting the weighted graph, the weighted graph generated by the graphing engine, and a graph generated by segmentation of the weighted graph via the segmenting component.

10. The method of claim 8, wherein the weighted graph comprises a modified weighted graph.

11. The method of claim 8, wherein the vertices of the weighted graph are weighted based at least in part on a number of postings to the corresponding newsgroups and the edges of the weighted graph are weighted based at least in part on a number of cross-postings between the two corresponding newsgroups.

12. The method of claim 8, further comprising:
using the weighted graph, by a search engine, when executing a newsgroup search and providing results from the newsgroups search.

13. The method of claim 8, further comprising:
generating, by an e-mail program, a suggestion that a post be cross-posted to other newsgroups, the other newsgroups identified at least in part by the weighted graph.

14. The method of claim 8, wherein segmenting the weighted graph comprises segmenting via spectral clustering.

15. Computer storage media storing instructions that, when executed by a computing device, cause the computing device to perform acts comprising:
receiving data relating to a plurality of newsgroups and cross-postings between the plurality of newsgroups;
constructing a weighted graph with a subset of the newsgroups represented as vertices of the graph and cross-postings between two newsgroups of the subset of newsgroups represented as edges between vertices corresponding to the two newsgroups;
excluding particular newsgroups from being represented in the weighted graph so as to facilitate reducing a size of the weighted graph;
removing edges of the graph with a weight less than a threshold weight so as to facilitate reducing the size of the graph;
segmenting the weighted graph; and
merging a first cluster of vertices and edges of the weighted graph into a second cluster of vertices and edges of the weighted graph if a sum of weights between the clusters is greater than a threshold.

16. The media of claim 15, wherein the acts further comprise: storing newsgroup data received by the data reception component, algorithms utilized for segmenting the weighted graph, the weighted graph generated by the graphing engine, and a graph generated by segmentation of the weighted graph via the segmenting component.

17. The media of claim 15, wherein the weighted graph comprises a modified weighted graph.

18. The media of claim 15, wherein the vertices of the weighted graph are weighted based at least in part on a number of postings to the corresponding newsgroups and the edges of the weighted graph are weighted based at least in part on a number of cross-postings between the two corresponding newsgroups.

19. The media of claim 15, wherein the acts further comprise:
using the weighted graph, by a search engine, when executing a newsgroup search and providing results from the newsgroups search.

20. The media of claim 15, wherein the acts further comprise:
generating, by an e-mail program, a suggestion that a post be cross-posted to other newsgroups, the other newsgroups identified at least in part by the weighted graph.

21. The media of claim 15, wherein segmenting the weighted graph comprises segmenting via spectral clustering.

* * * * *